(12) United States Patent
Hsu et al.

(10) Patent No.: US 10,467,633 B2
(45) Date of Patent: Nov. 5, 2019

(54) BUSINESS SOFTWARE APPLICATION SYSTEM AND METHOD

(75) Inventors: Yun-Ping Hsu, Cupertino, CA (US); Majed Itani, San Jose, CA (US); Ajay Gupta, Cupertino, CA (US); Roger Smith, Morrisville, NC (US); Rob Aagaard, Cupertino, CA (US); Andrew Wu, Sunnyvale, CA (US); Collin Lee, Cupertino, CA (US); Lila Alexei Tretikov, Los Gatos, CA (US)

(73) Assignee: SUGARCRM INC., Cupertino, CA (US)

( * ) Notice: Subject to any disclaimer, the term of this patent is extended or adjusted under 35 U.S.C. 154(b) by 0 days.

(21) Appl. No.: 12/636,520

(22) Filed: Dec. 11, 2009

(65) Prior Publication Data

US 2010/0185968 A1 Jul. 22, 2010

Related U.S. Application Data

(60) Provisional application No. 61/121,825, filed on Dec. 11, 2008.

(51) Int. Cl.
*G06F 3/048* (2013.01)
*G06Q 30/02* (2012.01)

(52) U.S. Cl.
CPC .................... *G06Q 30/02* (2013.01)

(58) Field of Classification Search
CPC ................................ G06F 3/048; G06F 17/30
USPC ............... 715/224, 225, 226, 700, 744, 217; 709/201; 707/609
See application file for complete search history.

(56) References Cited

U.S. PATENT DOCUMENTS

| | | | |
|---|---|---|---|
| 6,999,956 B2 * | 2/2006 | Mullins | |
| 2007/0180126 A1 * | 8/2007 | Merkh et al. | 709/227 |
| 2008/0294996 A1 | 11/2008 | Hunt et al. | |
| 2008/0295038 A1 | 11/2008 | Helfman et al. | |
| 2009/0070755 A1 * | 3/2009 | Taylor et al. | 717/168 |
| 2009/0271762 A1 * | 10/2009 | Taylor et al. | 717/107 |

OTHER PUBLICATIONS

International Search Report, PCT/US09/67777, dated Feb. 17, 2010.
Written Opinion, PCT/ US09/67777, dated Feb. 17, 2010.

* cited by examiner

*Primary Examiner* — Rashawn N Tillery
(74) *Attorney, Agent, or Firm* — Steven M. Greenberg, Esq.; Shutts & Bowen LLP

(57) ABSTRACT

A business software application system and method are provided that include a feed system for distributing changes about the application/module to a group of users and a cloud connector system that links external data sources to the business software application system and method.

8 Claims, 23 Drawing Sheets

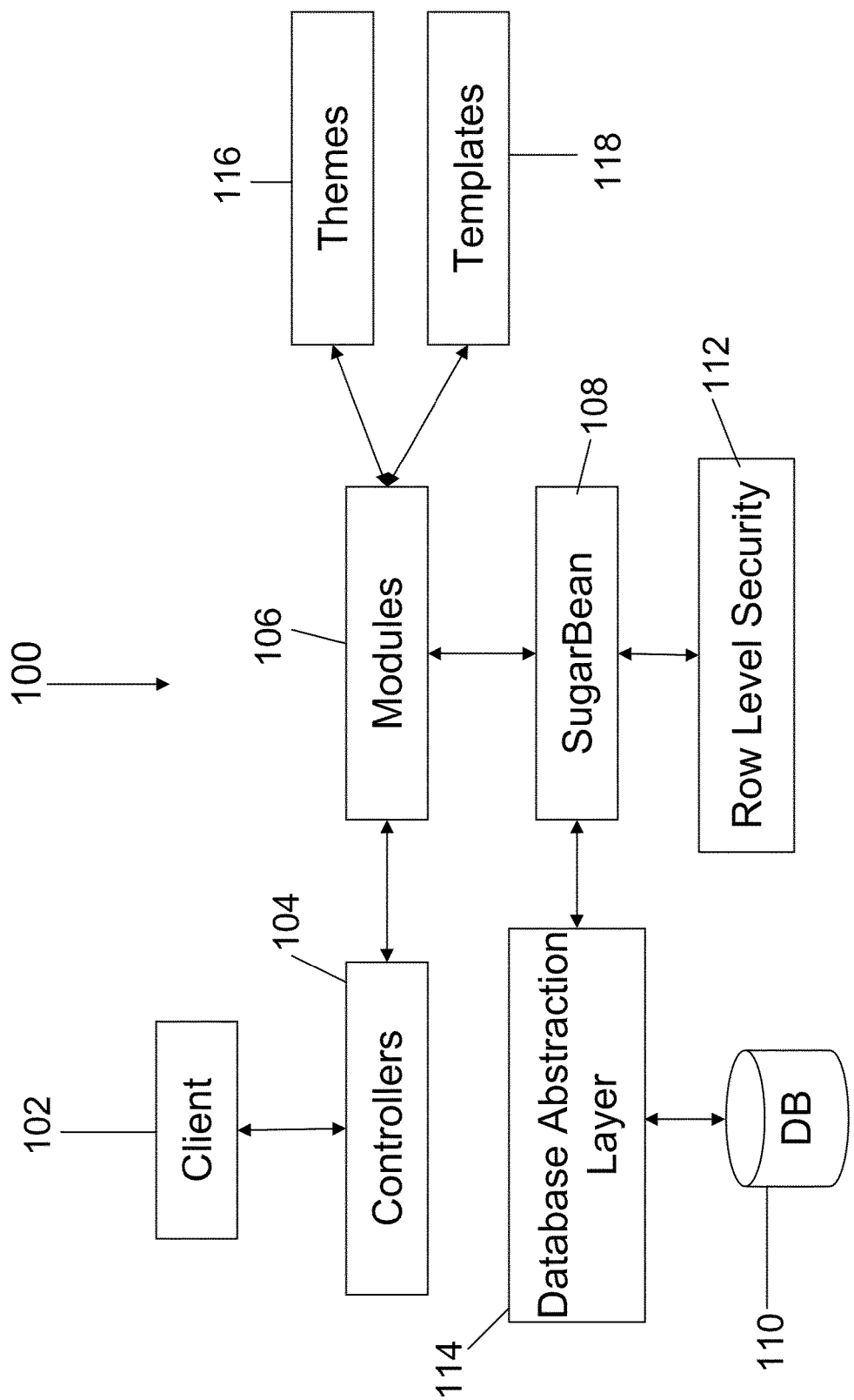

```
// Example of Logic Hook code for Sugar Feed to capture Leads information.

class LeadFeed extends FeedLogicBase {
    var $module = 'Leads';
    function pushFeed($bean, $event, $arguments){
        global $locale;

$text = '';
        if(empty($bean->fetched_row)){
            $full_name =
$locale->getLocaleFormattedName($bean->first_name, $bean->last_name, '');

$text = '{SugarFeed.CREATED_LEAD}[' . $bean->module_dir .
':' . $bean->id . ':' . $full_name . ']';
        }else{
            if(!empty($bean->fetched_row['status']) && $bean->fetched_row['status'] != $bean->status && $bean->status ==
'Converted'){
                // Repeated here so we don't format the name on "uninteresting" events
                $full_name =
$locale->getLocaleFormattedName($bean->first_name, $bean->last_name, '');

$text = '{SugarFeed.CONVERTED_LEAD}[' .
$bean->module_dir . ':' . $bean->id . ':' . $full_name . ']';
            }
        }
        if(!empty($text)){
            SugarFeed::pushFeed($text, $bean->module_dir, $bean->id // BEGIN SUGARCRM PRO ONLY
                , $bean->team_id // END SUGARCRM PRO ONLY
            );
        }
    }
}
```

FIGURE 21A

```
// The table definition for the Sugar Feed.

CREATE TABLE `sugarfeed` (
  `id` char(36) NOT NULL,
  `name` varchar(255) default NULL,
  `date_entered` datetime default NULL,
  `date_modified` datetime default NULL,
  `modified_user_id` char(36) default NULL,
  `created_by` char(36) default NULL,
  `description` varchar(255) default NULL,
  `deleted` tinyint(1) default '0',
  `team_id` char(36) default NULL,
  `assigned_user_id` char(36) default NULL,
  `related_module` varchar(100) default NULL,
  `related_id` char(36) default NULL,
  `link_url` varchar(255) default NULL,
  `link_type` varchar(30) default NULL,
  PRIMARY KEY (`id`),
  KEY `sgrfeed_date` (`date_entered`,`team_id`,`deleted`)
)
```

FIGURE 21B

BUSINESS SOFTWARE APPLICATION SYSTEM AND METHOD

PRIORITY CLAIM/RELATED APPLICATIONS

This application claims the benefit under 35 USC 119(e) and priority under 35 USC 120 to U.S. Provisional Patent Application Ser. No. 61/121,825 filed on Dec. 11, 2008 and entitled "Business Software Application System and Method", the entirety of which is incorporated herein by reference.

FIELD

The system and method relate generally to a business software system and method and in particular to a software-based system and method for providing customer relationship management.

BACKGROUND

Customer relationship management (CRM) systems and solutions are well known. For example, typical known CRM systems include Microsoft® CRM, SalesForce, a CRM product provided by SalesForce.com, Netsuite CRM, and SAP Business One CRM. However, conventional CRM systems have significant limitations that include a lack of flexibility, high costs, and a closed-source structure which is embedded into the traditional product offerings. These limitations have led to a failure rate of over 70% with traditional CRM implementations. Thus, it is desirable to provide a customer relationship management system and method that overcomes these limitations of typical CRM systems and it is to this end that the system and method are directed.

SUMMARY

A business application system and method are provided that include a number of features as set forth below in detail. In one embodiment, the business application may be software based customer relationship management system.

BRIEF DESCRIPTION OF THE DRAWINGS

FIG. 1A is a diagram illustrating an implementation of a business software application system, implementing a customer relationship management system, that incorporates various features;

FIGS. 8-10 illustrate examples of lead record of the business software application system with external data sources data;

FIG. 16 illustrates an example of a user interface for merging external data source fields with the business software application system;

FIGS. 21A and 21B are an example of code that hooks into the logic hooks for the Sugar Feed portion of the business software application system.

DETAILED DESCRIPTION OF ONE OR MORE EMBODIMENTS

The system and method are particularly applicable to an open source customer relationship management software system and it is in this context that the system and method will be described. It will be appreciated, however, that the algorithms, data structures, processes and modules of the system and method have greater utility since these modules, algorithms, data structures and processes disclosed herein can be equally applied to other non-open source CRM systems, as well as other business software application systems as well as other database software systems. For purposes of illustration, the described system is an implementation in a customer relationship management (CRM) and groupware system. In the example below, the CRM and groupware system is the Sugar Enterprise version 5.2 that is soon to be commercially available from SugarCRM Inc.

The system may be implemented using a base class known as SugarBean, and a data retrieval API. A few of the methods provided in the base class include methods for building list queries, saving, and retrieving individual items. Each specific type of data creates a subclass of this base class. The base class is called SugarBean in the illustrative example that is described below. There is at least one subclass of SugarBean for each module. SugarBeans also are used for creating database tables, cleaning out database tables, loading records, loading lists, saving records, and maintaining relationships. One example of a SugarBean subclass is a Contact subclass. The Contact subclass is a simple object that fills in some member variables on the SugarBean and leverages SugarBean for much of its logic and functionality. For example, the security associated with the Contact subclass is automatically created for Contact by SugarBean that contains, among other things, the functions and processes that are shared by the other modules. Another example of a SugarBean subclass is Users which is a module that is security related and contains the list of users as well as users who should not have row level security (described below in more detail) applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in the program is to look at existing data.

Figure 1B:
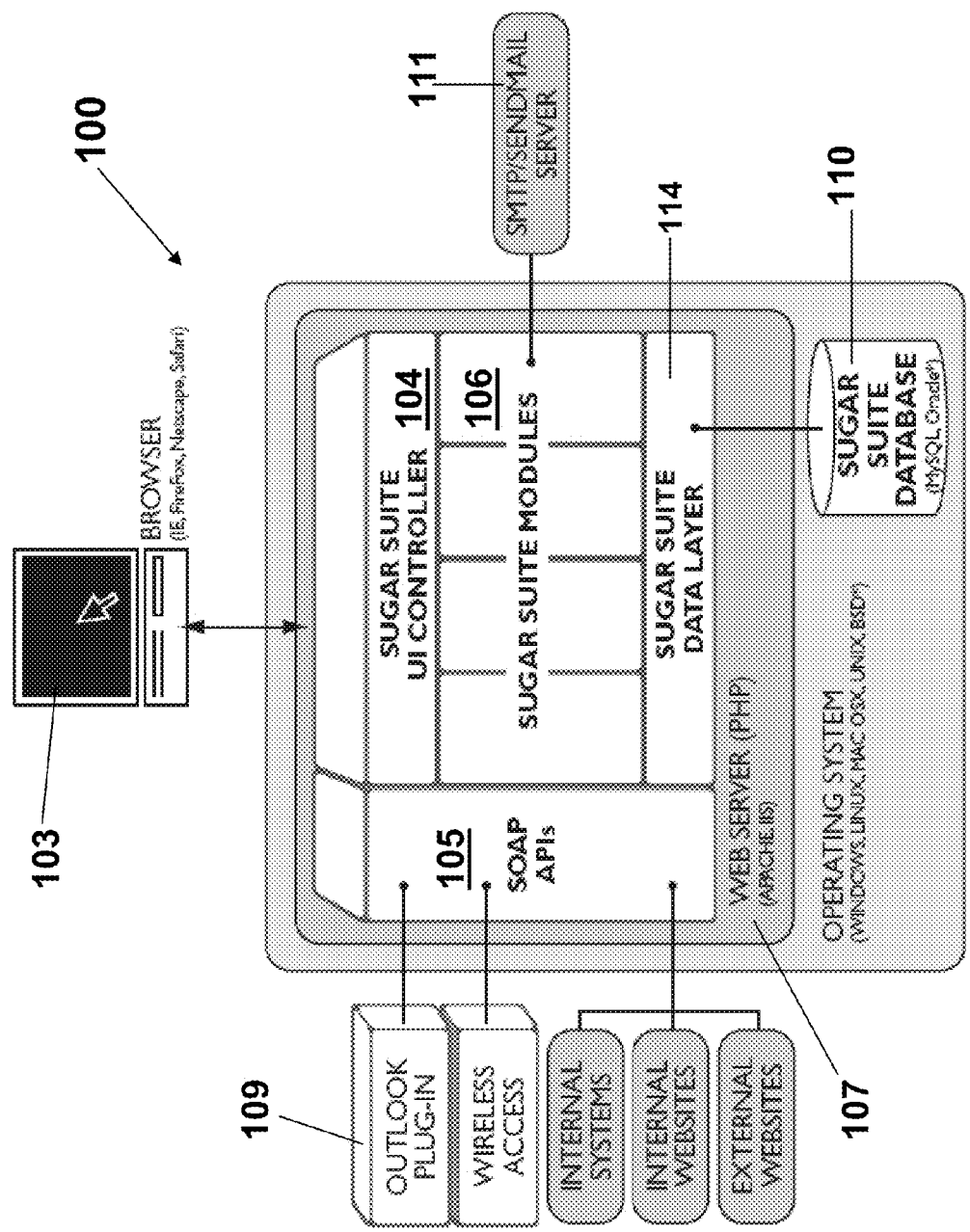
FIG. 1B illustrates more details of the business software application system that incorporates various features.

FIG. 1A is a diagram illustrating a customer relationship management (CRM) system 100 that is an example of a software-based business software application. In one embodiment, the system 100 may be implemented as a software system and the elements shown in FIGS. 1A and 1B are thus implemented as a plurality of lines of computer code that may be executed by a processor of a computer system, such as a server computer wherein the various lines of computer code are stored in a memory associated with the computer system and the system interfaces with a database 110 that stores the data associated with the system 100. The system may have one or more clients 102, such as a browser application executed on a typical computing device (a browser client session), that accesses the system over a communications network 103 such as the Internet, a cellular network, a wireless network and the like. The computing devices may include a laptop, table or desktop computer system, a PDA, a mobile phone, a portable wireless email device and the like. The client's 102 interactions with the system are managed and go through a set of one or more controllers 104. The controllers 104 are the entry-point into the system for an entity that is using the system wherein the entity may be a person who accesses the system, such as by using a browser application, a computing device or a software program that uses this entry point. The controllers 104 take care of functions and operations including, for example, session tracking, session security and user authentication. The controllers also, for each user, prepare the screen/user interface or the wrapper for the content and determine which module of the application the user is trying to access and get the requested module to process the request.

The system has one or more modules 106 that are components of application functionality and provide certain functionality to the entity accessing the system. The modules 106 of the exemplary CRM system shown in FIG. 1A may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. The system may include different, more or fewer modules and the systems with those other combination of modules are within the scope of the system and method. Each of these modules provides a different functionality to the users of the system so that, for example, the calendar module provides a calendaring functionality to the CRM system that is instantiated with the system. The system may also include an administration module that handles the typical administrative functions of the system. In the exemplary system shown in FIG. 1A, each module contains a subclass of a SugarBean base object 108 and each module references the SugarBean to retrieve the data from the database 110 required for display and uses certain functions and operations instantiated in the SugarBean base object.

Figure 2:
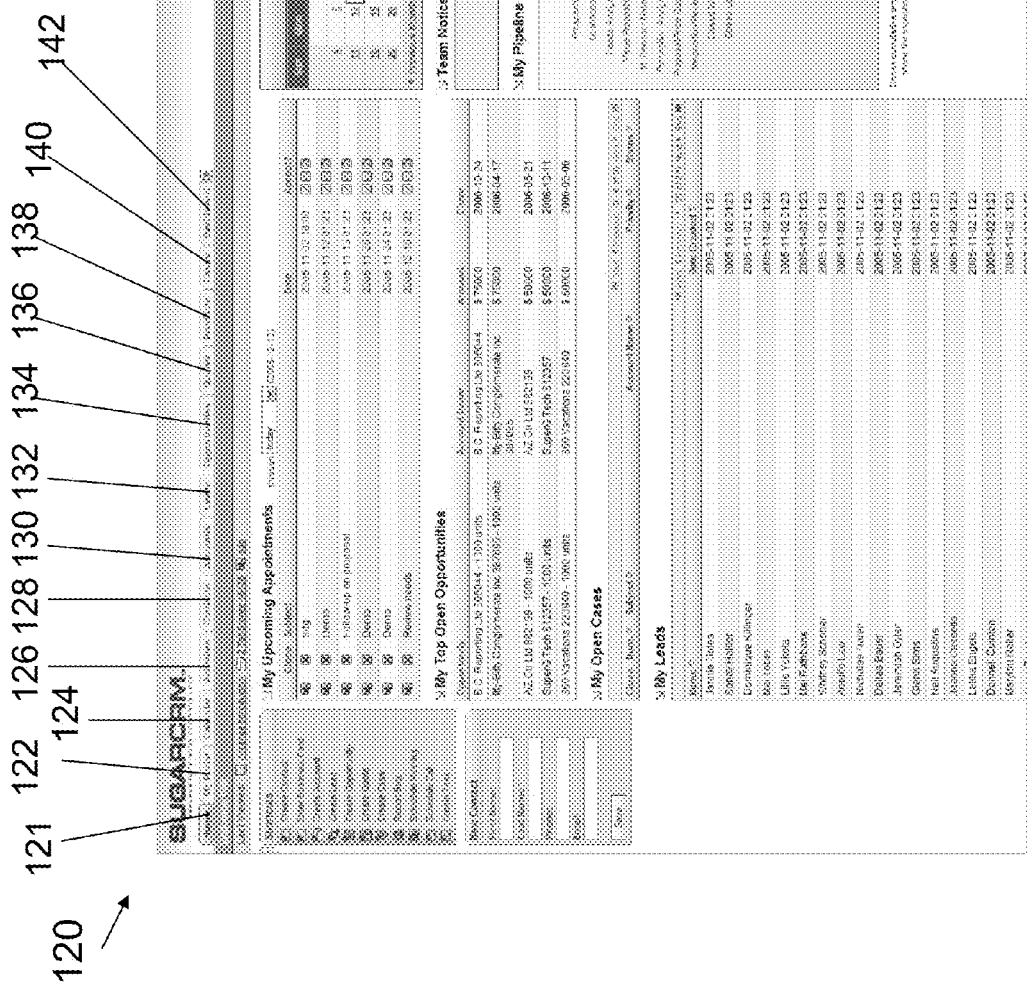
FIG. 2 is a diagram illustrating an example of the user interface of the system in FIGS. 1A and 1B.

FIG. 2 is a diagram illustrating an example of the user interface 120 of the system in FIGS. 1A and 1B. The user interface may include a home tab 121 (that is selected in FIG. 2) that provides a general overview of Cases, Opportunities, Appointments, Leads, Tasks, Calendar, Team Notices, and Pipeline for the particular user since each user interface is customized for each user based on the access levels and parameters associated with that particular user. The home tab may also include shortcuts to enter various different types of data, and a quick form for new contacts. The home tab also provides a quick overview of what customer tasks and activities that the user needs to focus on today. The portal module (selected using a "My portal" tab 122), contains a series of shortcuts which can link to any web site chosen by the user that may include e-mail, forums, or any other web-based application, allowing the system to become a single user interface for multiple applications. The calendar module may be selected by a calendar tab 124 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 126 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages and to send or receive email messages.

The contacts module is accessed by a contacts tab 128 and allows the user to view a paginated contact list, or search for a contact. The user can click on a specific contact to zoom in on the detailed contact record and, from a specific contact record, the user may link to the related account, or leads, opportunities, cases, or direct reports (related contacts). Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 130 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 132 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Enterprise are core to many business processes that require accurate data. Leads are typically fed into the Sugar Enterprise stem automatically from your website, trade show lists or other methods. However, the user can also directly enter leads into Sugar Enterprise manually.

The opportunities module is accessed by an opportunities tab 134 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account for example among other items. Opportunities help the user manage the selling process by tracking attributes such as sales stages, probability of close, deal amount and other information. The quotes module may be accessed by a quotes tab 136 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with, for example, Accounts, Contacts, or Opportunities among other modules in the system and the system is not limited to a quote being associated with any particular set of modules.

The products module may be accessed by a products tab 138 and permits the user to view a paginated list of products, or search for a specific product. The user can click on an individual product to zoom in on the detailed product information. A product is used when assembling a customer quote. The cases module may be accessed using a cases tab 140 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. A dashboard module may be accessed using a dashboard tab 142 and permits the user to view a dashboard of the information in the CRM system.

The documents module may show the user a list of documents that the user can access, view and/or download. The user can also upload documents, assign publish and expiration dates, and specify which users can access them. The email module allows the user to write and send emails and to create Email Templates that can be used with email-based marketing campaigns. The user can also read, compose, save drafts, send and archive emails. The campaigns module helps the user implement and track marketing campaigns wherein the campaigns may be telemarketing, web banner, web tracker, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress completed, users can update the information for each task. The RSS module permits the user to view the latest headlines provided by your favorite Really Simple Syndication (RSS) feeds. These feeds provide news or other web content that is distributed or syndicated by web sites which publish their content in this manner. The system has information on hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and re-submit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source. The system also supports users putting graphs from their reports directly on their dashboards.

Returning to FIG. 1A, the system also includes the database 110 that contains the data of the system and a security module 112 (row level security) that implements the security methods to control access to the data in the database 110 since the database is shared by all users of the system and the data must be segregated based on the users and their access level to different pieces of data. The system may also include a database abstraction layer 114 that is coupled between the database 110 and the SugarBean object 108 and acts as an interface between the database 110 and the SugarBean object 108. The SugarBean object 108 provides the base logic required for retrieving, making available and writing information to/from the database and each module creates subclasses of SugarBean (an example of which was described above) to provide module specific details, module specific data and module specific data views. During the process of retrieving data from the database, the SugarBean 108 makes calls that populate the row level security information into the SQL engine/database management system that retrieves the data.

Once the data is retrieved from the database by the SugarBean object 108, the module uses a template mechanism 118 and a theme 116 to produce the requested presentation (user interface) for the user. The template mechanism reformats the data from the database 110 into a particular form while the theme adjusts the user interface according to the user's preferences.

If, for instance, the user requests an HTML presentation of the detail view of the contact module for a specified contact, the system may perform that request as will now be described. The request of the user is directed to controller named index.php that handles most of the logic for the main application. The controller loads the current user information, verifies authentication and session information for the particular user session, loads the language for the user (based on the user preferences) and generates some of the user interface shell. The controller then calls the contact module and request the detail view for the specified contact. The contact module then retrieves the requested contact using the Sugarbean. The SugarBean verifies row level security for the requested contact at this point (with assistance from the security module 112. If the record is not retrieved successfully, then the process aborts and the user is not allowed to view the data for the record. If the retrieve process succeeds with the requested contact data, the Contact module uses the templating mechanism, such as for example XTemplate or Smarty, in the template mechanism 118 and the code for the current user's theme (retrieved by the theme module 116) is used to create the user interface for the presentation of the particular Contact data to the particular user. The resulting user interface then is sent back to the computing device with of client that requested it.

FIG. 1B illustrates more details of the customer relationship management system 100. Like elements shown in FIGS. 1A and 1B have like reference numerals. The system may interface with a typical browser application 103 (being executed by a computing device) that can access the system 100 over the web. For example, the examples of the user interface below are web-based views generated by the system and displayed on a browser application. The system may further comprise an application programming interface (APIs) portion 105, that may preferably use the well known simple object access protocol (SOAP), to interface with other existing system and applications. For example, the APIs may be used to interface to an email plug-in 109, such as an SugarCRM Plug-In for Microsoft Outlook®, that enhances the email program to allow it to interact with the system 100. As shown, the system 100, in one implementation, is implemented on a web server application 107 (that may be the well known Apache web server that includes IIS functionality) that generates dynamic web pages (using the known PHP language). The web server and the other elements of the system may be implemented as software running on one or more servers wherein the servers may use various different operating system as shown in FIG. 1B. The system 100 may also have an email module 111 capable of sending email via a local program (that may preferably be sendmail) or an email server leveraging the SMTP protocol.

Now, a cloud connector portion of the business software application system is described. The cloud connector may be implemented, in one embodiment, in a plurality of lines of computer code that are executed by the computer system that hosts the business software application system. In one embodiment, the cloud connector portion may be a module that is part of the modules 106 shown in FIGS. 1A and 1B. The cloud connector portion further comprises one or more abstract data source connectors that bring data from the privately or publicly accessible network-accessible application (cloud) into the business software application system. The cloud connector engine may further compose and associate related data based on inferred relationships, linguistic heuristics, implicit conversational threads, etc., which can be embodied by one or more algorithms. The cloud connector portion may include an administrative interface to explicitly control and configure the mapping at field-to-field level between the external data source and the business software application system's record definition and may translate data from external data source values into internal values through a function which is done via a programming framework. In addition the system may correlate this data at field or object level and relate it to existing entities in the system, or other entities available on the network.

The cloud connector portion may be implemented to access Web Services, a variety of available APIs, data import sources, or to extract data directly from text sources as well as other encoding formats. The system may support multiple connectors that each access different external or internal data sources on a network. An administrator can further explicitly configure the priority of data sources so that, if data is not found from the first source, the system will automatically search from the next source in priority order until the necessary data is located. Alternatively, an algorithm may control the behavior and precedence of final prioritization and arrangement of information. Such an algorithm may be implemented to obtain ranking heuristics from parameters such as access volumes for specific data found, watch counters, update frequency, search ranking, number of conversation threads, etc. A combination of such parameters may be used to determine the winning source or set of sources.

The cloud connector portion may also have an interactive interface for the end user to refine a search and inference algorithm and select the search results to incorporate into the system. Such an input can be used to further tune such an algorithm to optimize for the most accurate and relevant results. The administrator may choose to emphasize the relevance of a given source by adding to its "prevalence score" explicitly through the application UI. The end users may add to this "prevalence score" via their usage patterns around accessing specific data.

The cloud connector portion may also have a data-merging feature (in a data merging portion that may be implemented by a plurality of lines of computer code) that associates and interrelates complementary data from different sources based on priority and existence as well as removes or de-emphasizes redundant information. For example, if two different data sources contain related data about a topic, such as company A, the cloud connector portion combines the data together. Similarly, if two different data sources contain the same data, the cloud connector portion removes the redundant data before the data is stored in the database.

The cloud connector portion may also define hot fields that can be extrapolated. Let us take an example of accumulating information on a specific company A via the cloud connector portion of the applications. The parent company attribute of a company A's record and the information on such a parent company may be automatically retrieved and used in conjunction with the original company information. Another example of extrapolation is discovery and association of information on key executives from a company A; such information can be automatically retrieved and added as a contact to company A's (account) record.

The cloud connector portion of the CRM application may also include a set of extrapolated fields. These fields may be non-static inferred fields for any particular object. For instance, some key employee of company A may become a key employee of company B over a period of time T. If the cloud connector portion of the application is in place, this information can be monitored and identified through continuous connectivity to the various information clouds. If such a change of a dynamic attribute is detected, the system may modify such values or allow for those values to be modified by the user.

The information for the embodiment of the cloud connector can be modeled in a variety of algorithmic models, including such well-known concepts as incidence or adjacency matrixes. Certain data points may have no relationships with another datum, while others may have an abundance of related information. Cloud connectors may organize and store all information related to the CRM business entities and may further monitor this information for external or internal changes. If relational changes between data objects are detected by the cloud connector system/portion, the system may implement two types of healing mechanisms: explicit (such as alerts) and implicit (such as machine learning-based data modification).

Explicit mechanism may trigger alerts on specific changes in data or relationships on objects of interest. The system may gage interest by the status or usage of a specific object in the CRM system, or they can be explicitly set through the user interface by the end user. Such alerts may further trigger workflows within the CRM application, messaging (voice, email, etc.) or external system processes. The end user may wish to take an action and correct or reconfigure routing or workflow rules in the system as well as the actual data point.

Implicit mechanism may be implemented via a neural-network learning system, which accepts multiple feedbacks from internal and external data that provide feeds to the cloud connectors. The system may automatically "heal" by identifying missing or incorrect data, data relationships and percolating effects of data changes and modifying all necessary entities accordingly. The system may further automatically trigger necessary workflows to provide additional error handling, monitoring and data quality assurance.

In the context of implicit data changes a concept of aging may be used to provide an additional dimension to the intelligence of the CRM system. In such an implementation the system monitors data and attribute changes with respect to time continuum and adjusts the algorithm's sensitivity accordingly. For example, if a company A had a partnership with a company C over a period of N years, but the frequency of updates on this relationship have reduced by factor of X year over year, the aging functionality may cause the alert mechanisms to reduce the value of this connection and eventually not trigger any alerts based on changes in the above data model.

The individual cloud connectors of the cloud connector portion may be packaged as modules 106 that can be loaded into the business software application system via the administration interface. The cloud connector portion may have a graphical administrator interface to control the cloud connector data source, the mapping of fields, etc. As shown in FIGS. 1A and 1B, the business software application system uses data stored in the store 110. The cloud connector portion allows developers (at the platform level) and users (at the application level) alike to be able to pull data from many different sources into the business software application system, which makes the business software application system more flexible and intelligent.

A simple example of an area of the business software application system that can be enhanced using the cloud connector is a lead qualification process. In a typical lead qualification process, a lead qualification person may spend 10-15 minutes gathering information (from external sources such as Hoovers, Google and LinkedIn) about the new lead and then has to cut and paste the relevant information into a lead record in the store 110 which is inefficient. The cloud connector portion allows integration with these external sources and streamlines the lead qualification process since the information from the external sources is available immediately to the lead qualification person.

In one implementation, the cloud connector portion may have a plurality of connectors (one for each different external data source) and one or more connectors may be loadable by any module 106 of the business software application system that is going to utilize data from one or more external data sources. The business software application system may ship with some connectors for certain data sources (such as Hoover, LinkedIn, Jigsaw, ZoomInfo and/or Crunchbase for example) and may also provide a mechanism for a developer to create a new connector for a new external or internal data source. The cloud connector portion may also include administration screens to manage connectors including enable/disable a connector, setup keys and URLs for each connector and associate one or more connectors with a particular module 106. In one implementation, the cloud connector portion may include user interface components (Admin, Connector Module Wizard, Module Loader Integration and Miscellaneous Widgets), code framework components to leverage connectors (wrappers, sources) along with pre-defined source implementations (Zoominfo, Hoovers, etc.) and module loader hooks to move uploaded custom source into the appropriate directories. The data may be retrieved from the external data sources using well-known protocols such as SOAP or REST. Now, the details of an implementation of the cloud connector portion are described in more detail.

The main components for the data source framework are the factories, source and formatter classes. The factories are responsible for returning the appropriate source instance given a source id. The source classes are responsible for encapsulating the retrieval of the data in a single record (getItem, loadBean) or list (getList, loadBeans). The formatters are responsible for rendering the display elements of the datasources.

Figure 3:
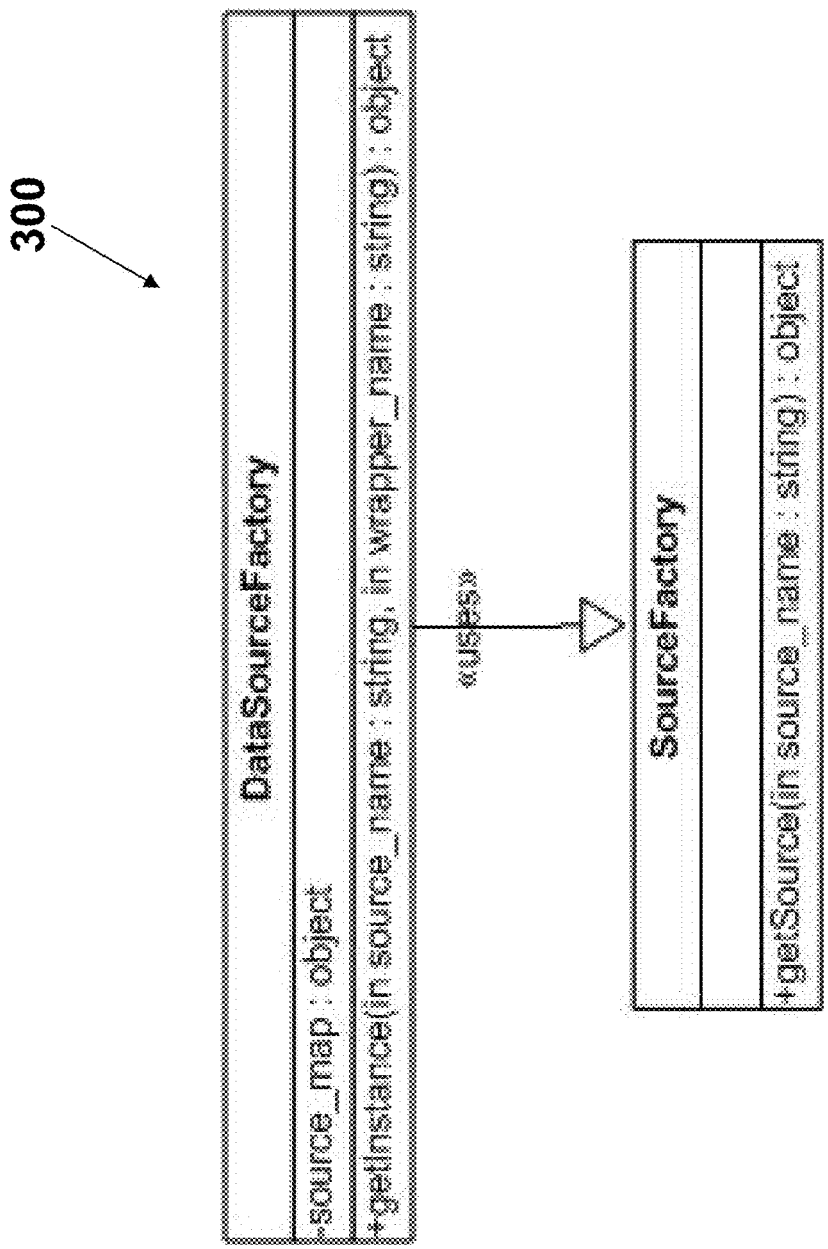
FIG. 3 illustrates a data source integration class for the business software application system.
Figure 4:
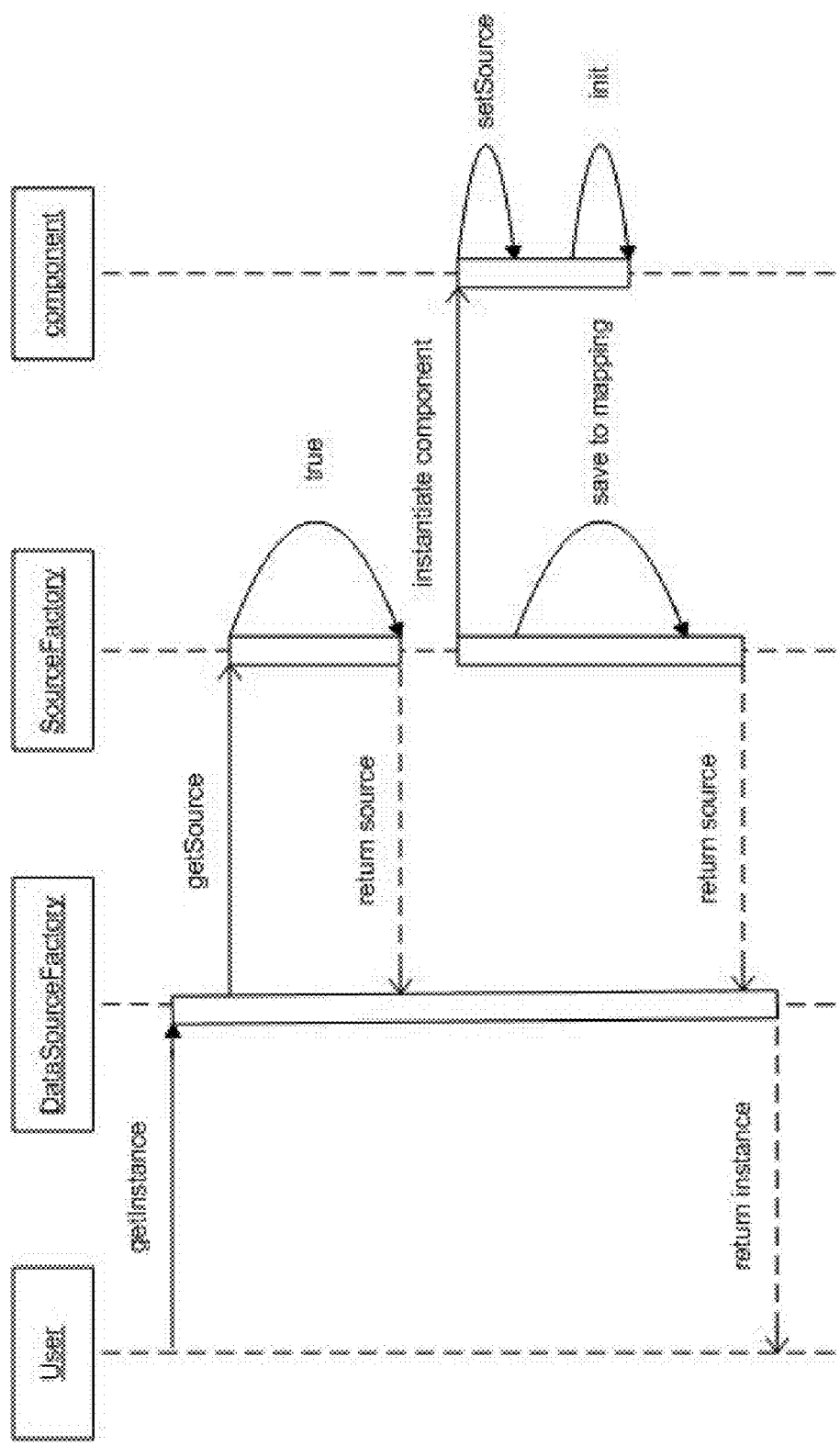
FIG. 4 illustrates a method for data source integration in the business software application system using the class shown in FIG. 3.

FIG. 3 illustrates a data source integration class 300 for the business software application system. The primary factory is the DataSourceFactory class shown in FIG. 3 which uses the static SourceFactory class to return a datasource instance. The main points to note are that given a source name (e.g. "ext_soap_hoovers"), the source name underscore characters are replaced with the file separator character. In this case, "ext_soap_hoovers" becomes "ext/soap/hoovers". Then the SourceFactory scans the datasources/sources directory to check for the presence of this file and returns the source instance if the file is found as shown in FIG. 4. Now, the sources of the cloud connector portion are described in more detail.

Figure 5:
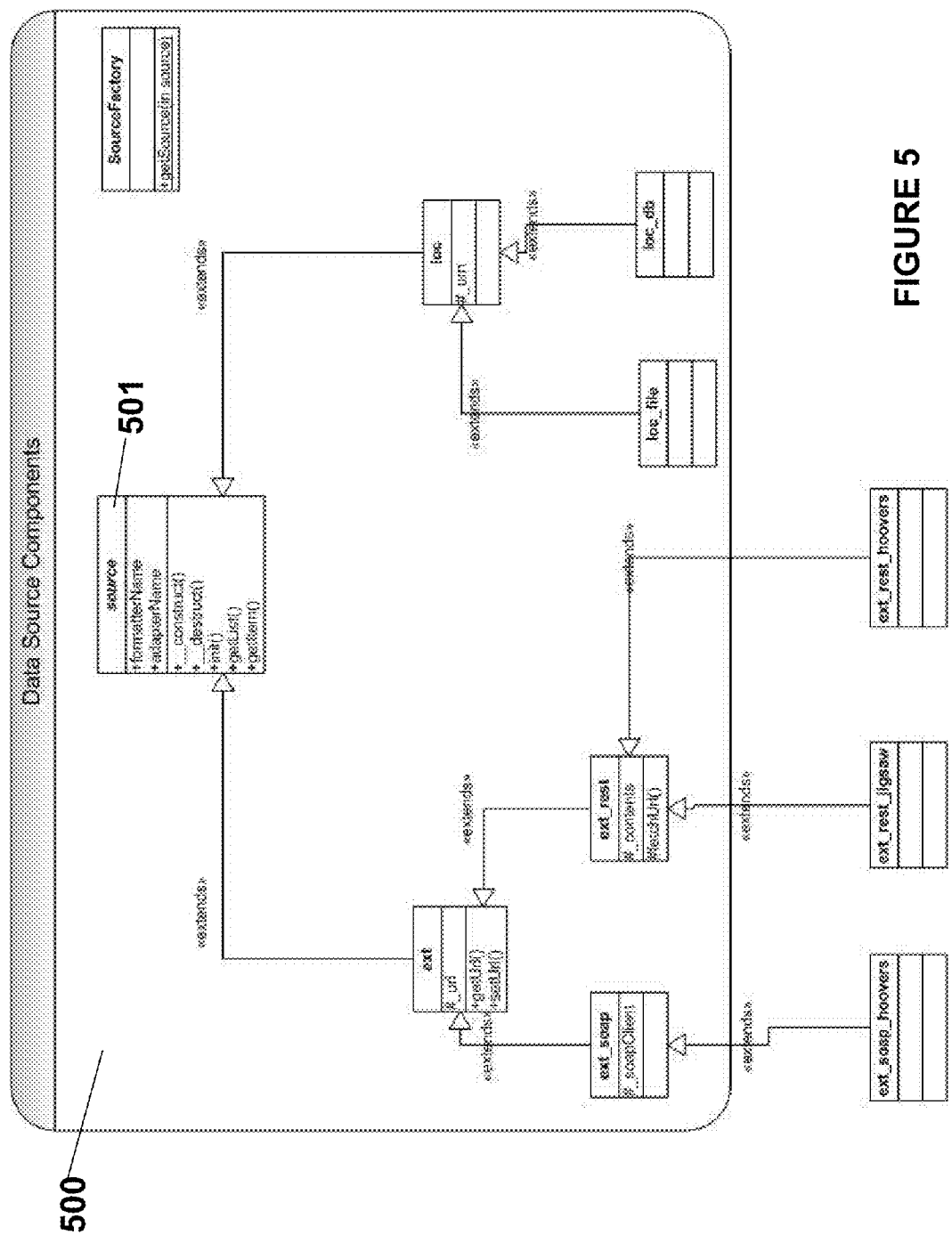
FIG. 5 illustrates an example of the data source components for an exemplary data source of the business software application system.

FIG. 5 illustrates an example of the data source components 500 for an exemplary data source of the business software application system. The cloud connector uses the data source components to seamlessly integrate existing data source (that already have connectors) and new data sources (for which a connector can be written by a developer) into the business software application system. In one embodiment, there are two categories of sources—REST implementation and SOAP implementation. A default source class 501 is abstract and the datasources need to provide a getList and getItem method implementation as shown in the pseudo code below.

```
/**
 * getItem
 * Returns an array containing a key/value pair(s) of a datasource record
 * @param $args Array of arguments to search/filter by
 * @param $module String optional value of the module that the datasource framework is attempting to map to
 * @return Array of key/value pair(s) of datasource record; empty Array if no results are found
 */
```

```
    public function getItem($args=array( ), $module=null){ }
    /**
    * getList
    * Returns a nested array containing a key/value pair(s) of a
datasource record
    *
    * @param $args Array of arguments to search/filter by
    * @param $module String optional value of the module that the
datasource framework is attempting to map to
    * @return Array of key/value pair(s) of datasource record; empty
Array if no results are found
    */
    public function getList($args=array( ), $module=null){ }
```

The class name of the datasource may be prefixed by either "ext_soap_" or "ext_rest_" as shown in FIG. 5 because the "_" character serves as a delimiter into the file system for the class to be found. For example, a SOAP implementation for a Hoovers datasource will have the class name "ext_soap_hoovers" and a REST implementation will have the class name "ext_rest_hoovers".

An example of the Array format for the getItem method of the Hoovers datasource is:

```
        Array(
            ['id'] => 19303193202,
            ['duns'] => 19303193202,
            ['recname'] => 'SugarCRM, Inc',
            ['addrcity'] => 'Cupertino',
        )
```

An example of the Array format for the getList method of the Hoovers datasource is:

```
        Array(
            [19303193202] => Array(
                ['id'] => 19303193202,
                ['duns'] => 19303193202,
                ['recname'] => 'SugarCRM, Inc',
                ['addrcity'] => 'Cupertino',
            ),
            [39203032990] => Array(
                ['id'] => 39203032990,
                ['duns'] => 39203032990,
                ['recname'] => 'Google',
                ['addrcity'] => 'Mountain View',
            )
        )
```

The key values for the getList/getItem entries should be mapped to a vardefs.php file contained with the datasource. This vardefs.php file is required for datasources. For example, we have something like:

```
<?php
$dictionary['ext_soap_hoovers'] = array(
    'comment' => 'vardefs for hoovers datasource',
    'fields' => array (
        'id' => array (
            'name' => 'id',
            'vname' => 'LBL_ID',
            'type' => 'id',
            'comment' => 'Unique identifier'
        ),
        'recname'=> array(
            'name' => 'recname',
            'input' => 'bal.specialtyCriteria.companyKeyword',
            'vname' => 'LBL_NAME',
            'type' => 'varchar',
            'comment' => 'The name of the company',
        ),
        'duns' => array (
            'name' => 'duns',
                'input' => 'bal.specialtyCriteria.duns',
            'vname' => 'LBL_DUNS',
            'type' => 'varchar',
            'comment' => 'Company id',
        ),
        'addrcity' => array (
            'name' => 'addrcity',
            'input' => 'bal.location.city',
            'vname' => 'LBL_CITY',
            'type' => 'varchar',
            'comment' => 'The city address for the company',
        ),
    )
);
?>
```

The 'input' key for the addrcity entry allows for some internal argument mapping conversion that the datasource uses. The period (.) is used to delimit the input value into an Array. In the example of the addrcity entry, the value bal.location.city will be translated into the Array ['bal']['locationl']['city']. The Hoovers SOAP calls require this form of input mapping.

The 'options' key for the addrcity entry maps to an entry in the mapping.php file to assist in the conversion of the datasource values to the database value format in the store 110 of the business software application system. For example, assume a datasource that returns an American city values as a numerical value (San Jose=001, San Francisco=032, etc.). Internally, the business software application system may use the city airport codes (San Jose=sjc, San Francisco=sfo). To allow the datasource framework to map the values, the options configuration is used.

Each source also needs to provide a config.php file that may contain optional runtime properties such as the URL of the SOAP WSDL file, API keys, etc. These runtime properties shall be placed under the 'properties' Array. At a minimum, a 'name' key should be provided for the datasource.

```
<?php
    $config = array (
        'name' => 'Hoovers', //Name of the datasource
        'properties' =>
        array (
            'HOOVERS_ENDPOINT' => 'http://hapi-dev.hoovers.com/axis2/services/AccessHoovers',
            'HOOVERS_WSDL' =>
            'http://hapi-dev.hoovers.com/axis2/Hapi.wsdl',
            'HOOVERS_API_KEY' =>
            'nmvsu5btfrrj66t3ayrscmee',
        ),
    );
?>
```

An optional mapping.php file may be provided so that predefined mappings (provided with an instantiation of the system) are defined. These mappings assist the datasource framework's component class. In the component class there are the fillBean and fillBeans methods. These methods use the getItem/getList results from the datasource instance respectively and return a SugarBean/SugarBeans that map the resulting values from the datasource to fields of the SugarBean(s). A mapping.php file should be created if the 'options' key is used in vardefs entries in the vardefs.php file.

```
<?php
$mapping = array (
    'beans' => array (
        'Leads' => array (
            'recname' => 'account_name',
            'id' => 'id',
            'duns' => 'duns_c', //Example to map to custom field
            'addrcity' => 'primary_address_city',
        ),
        'Accounts' => array (
            'recname' => 'name',
            'id' => 'id',
            'duns' => 'duns',
            'addrcity' => 'primary_address_city',
        ),
    ),
);
?>
```

In this example, there are two modules that are mapped (Leads and Accounts). The datasource keys are the Array keys while the business software application system module's fields are to the left. In the example of the 'options' Array as discussed in the vardefs.php file section, an addrcity_dom element maps numerical city values to airport codes.

In one embodiment, the sources and their supporting files may be placed into self contained directories. In the Hoovers SOAP example, the directory Structure for sources would be as follows:

```
*sources/ext/soap/hoovers/hoovers.php
*sources/ext/soap/hoovers/vardefs.php
*sources/ext/soap/hoovers/config.php
*sources/ext/soap/hoovers/mapping.php
*sources/ext/sopa/hoovers/language/en_us.lang.php
//language files for localization
```

Figure 6:
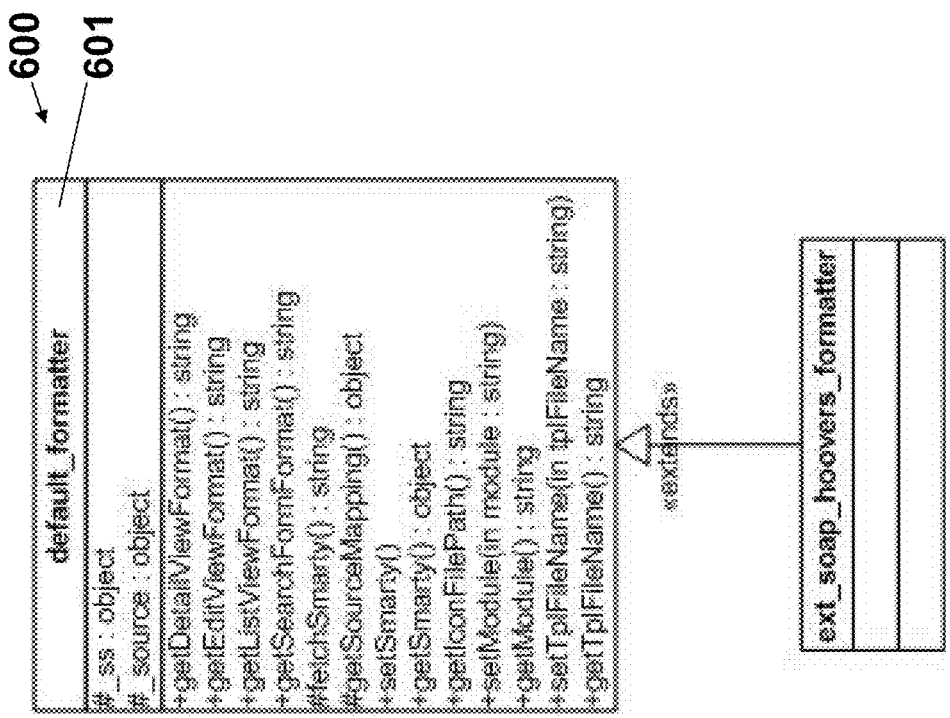
FIG. 6 illustrates a data source formatter class for the business software application system.

FIG. 6 illustrates a data source formatter class 600 for the business software application system. The Formatter components are used by the datasource framework/cloud connector to render a popup window on the browser that is invoked in the datasource wizard's listview results as well as the detailview and editview of a business software application system module that is configured for the datasource. Like the sources, the formatters have a corresponding factory class (FormatterFactory). The header.tpl files for the DetailView and EditView code will invoke the display template engine uses the formatters to display data from these datasources. In one embodiment, the system renders a popup window that contains the data of the datasources. Like the naming of the source classes, the formatters follow the same convention of using the "ext_rest_" or "ext_soap_" prefix. However, to distinguish conflicting class names, a suffix "_formatter" is also used. Formatters extend from default_formatter 601 as shown in FIG. 6 which is a class diagram for an example of the Hoovers SOAP formatter extending from the default formatter.

As with the sources, the directory structure for formatters are also self containing

```
/ext/soap/hoovers/hoovers_formatter.php
/ext/soap/hoovers/images/
/ext/soap/hoovers/tpls/
```

Figure 7:
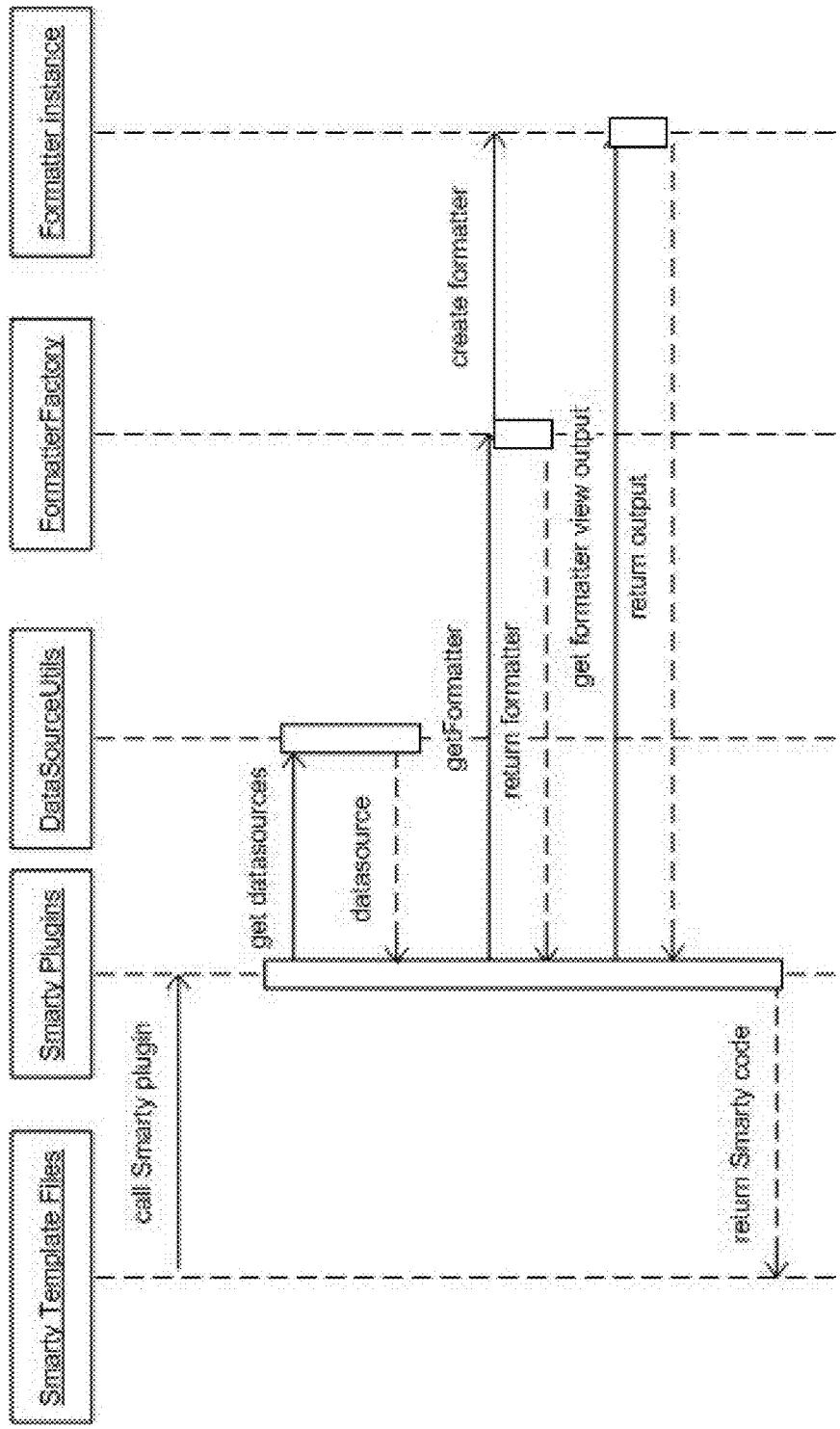
FIG. 7 illustrates a method for data source formatting in the business software application system using the class shown in FIG. 6.

The default_formatter class 601 provides an implementation of the getDetailViewFormat method as shown in FIG. 7. This method is responsible for rendering the "hover link" code that appears next to fields in certain modules. By default, the Contacts, Leads and Accounts module have the Account Name field modified to support the "hover link". The default_formatter class 601 will scan the tpls directory for a Smarty template file named after the module that is being viewed.

For example, the file /ext/soap/hoovers/tpls/Accounts.tpl may be used for the Accounts popup view. If the module named template file is not found (in this case Accounts.tpl), it will attempt to use a file named default.tpl. The formatters are invoked from the Smarty template code which in turn uses Smarty plugins to call the Formatter classes as shown in FIG. 7.

The configuration of each datasource connector (for each external data source) in the cloud connector portion may consist of three files at the datasource's root folder:

1. vardefs.php—file that will house the possible set of fields from a particular datasource 2. config.php—optional file containing configuration properties for username, password, url, etc. values. For example:

```
<?php
$config = array (
    'name' => 'Hoovers',
    'properties' =>
    array (
        'hoovers_endpoint' =>
        'http://hapi-dev.hoovers.com/axis2/services/AccessHoovers',
        'hoovers_wsdl' =>
        'http://hapi-dev.hoovers.com/axis2/Hapi.wsdl',
        'hoovers_api_key' => 'lsdl20932lsdfjalsd',
    ),
);
?>
```

3. mapping.php—file to provide mapping between a datasource fields and the fields in targeted modules. For example:

```
$mapping = array (
    'beans' => array (
        'Leads' => array (
            'id' => 'id',
            'recname' => 'account_name',
            'addrstreet' => 'primary_address_street',
            'addrstateprov' => 'primary_address_state',
                'addrcountry' => 'primary_address_country',
                'addrzip' => 'primary_address_postalcode',
            'phone' => 'phone_work',
            'salutation' => 'salutation',
            'finsales' => 'lead_source',
            'parent_duns' => 'parent_duns',
            'duns' => 'duns',
        ),
        'Accounts' => array (
            'id' => 'id',
            'recname' => 'name',
            'addrcity' => 'billing_address_city',
            'addrstateprov' => 'billing_address_state',
            'addrcountry' => 'billing_address_country',
            'addrzip' => 'billing_address_postalcode',
                    'parent_duns' => 'parent_duns',
                    'duns' => 'duns',
        ),
        'Contacts' => array(
            'id' => 'id',
            'recname' => 'account_name',
                'parent_duns' => 'parent_duns',
                'duns' => 'duns',
        ),
    ),
);
```

In the above example, there are three modules (Leads, Accounts and Contacts) that are mapped to the datasource. The values on the left hand side (from the datasource) will be mapped to the values on the right hand side (of the target module). The 'id' field mapping is used to uniquely identify a record and is needed by the datasource wizard components to select a unique record from the list of results in the datasource wizard components.

Each connector of the cloud connector portion can support localization through the use of language files placed in a folder named language under the particular datasource's root folder. The file should declare a key/value Array named $datasource strings.

Here is an example of the file contents:

```
$datasource_strings = array (
//vardef labels
'LBL_ID' => 'ID',
'LBL_FIRST_NAME' => 'First Name',
'LBL_LAST_NAME' => 'Last Name',
'LBL_JOB_TITLE' => 'Job Title',
'LBL_IMAGE_URL' => 'Image URL',
'LBL_COMPANY_NAME' => 'Company Name',
//Configuration labels
'url' => 'URL',
'api_key' => 'API Key',
);
```

The configuration labels use the key value in the config-.php files to render the label.

Figure 8:
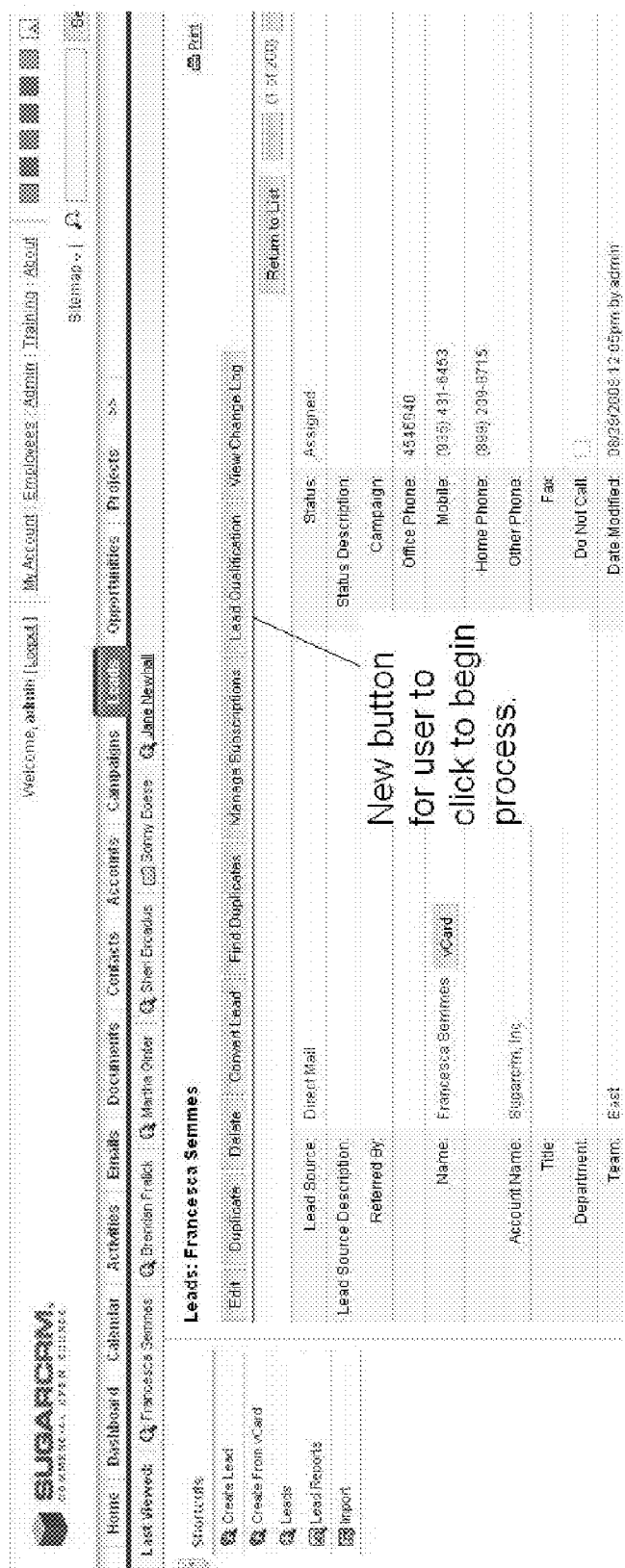
Figure 9:
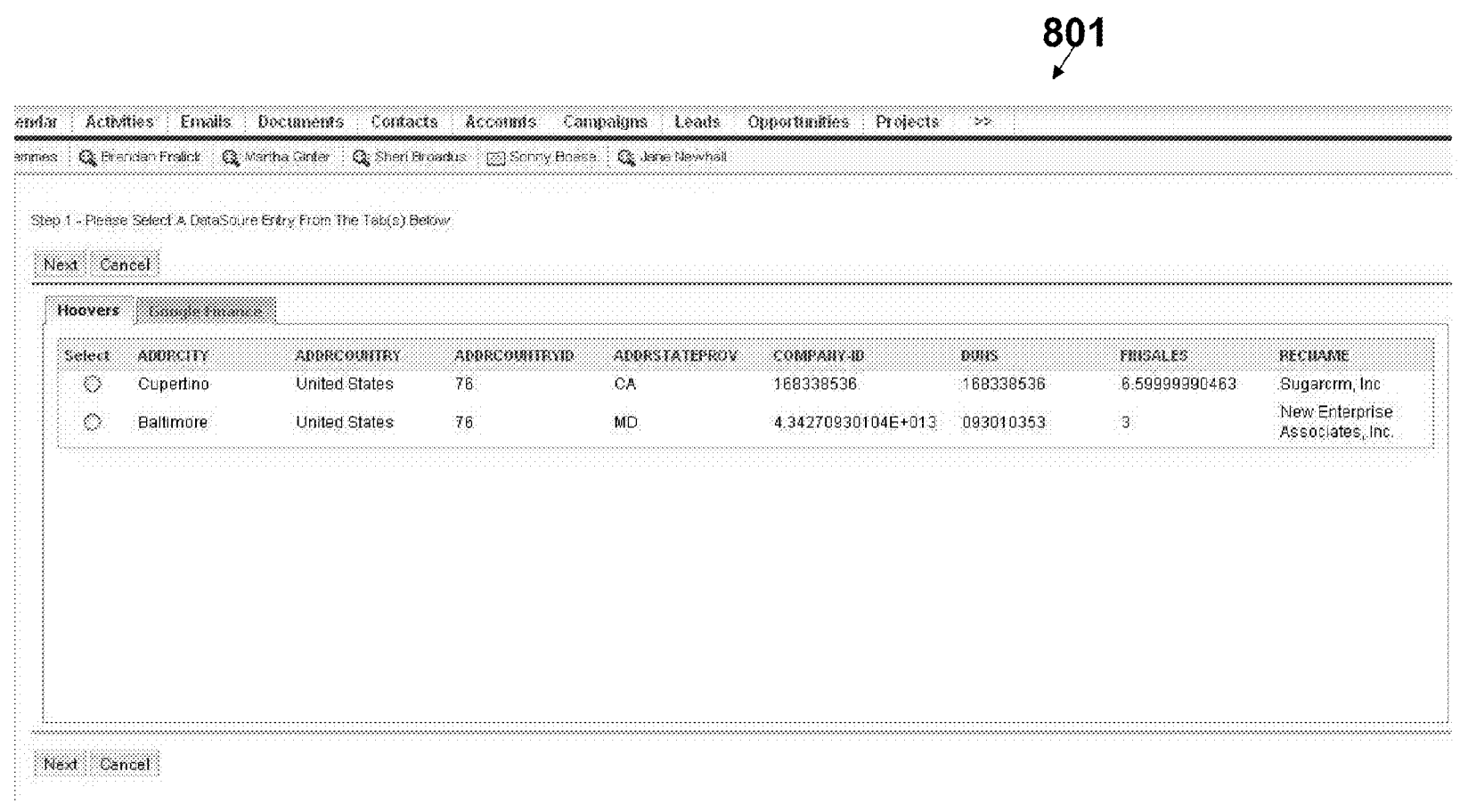

FIGS. 8-10 illustrates examples of lead record 800 of the business software application system with external data sources data. As shown in FIG. 8, the lead screen 800 has a button (shown as lead qualification in this example of the lead record) that starts the process to access an external data source. In a screen 801, the user may then choose an external data source to then associate fields with. For each data field found from the data source, a dropdown for the Lead's fields is shown beside it. The user can then choose which field to associate the data to as shown in FIG. 10. Alternatively, the particular connector may predefine this based on the mapping file associated with the data source and the connector.

The cloud connector portion may include various user interfaces, such as an administration interface, a connector modules interface, modular loader integration interface and a miscellaneous widgets interface, each of which is described below.

Figure 11:
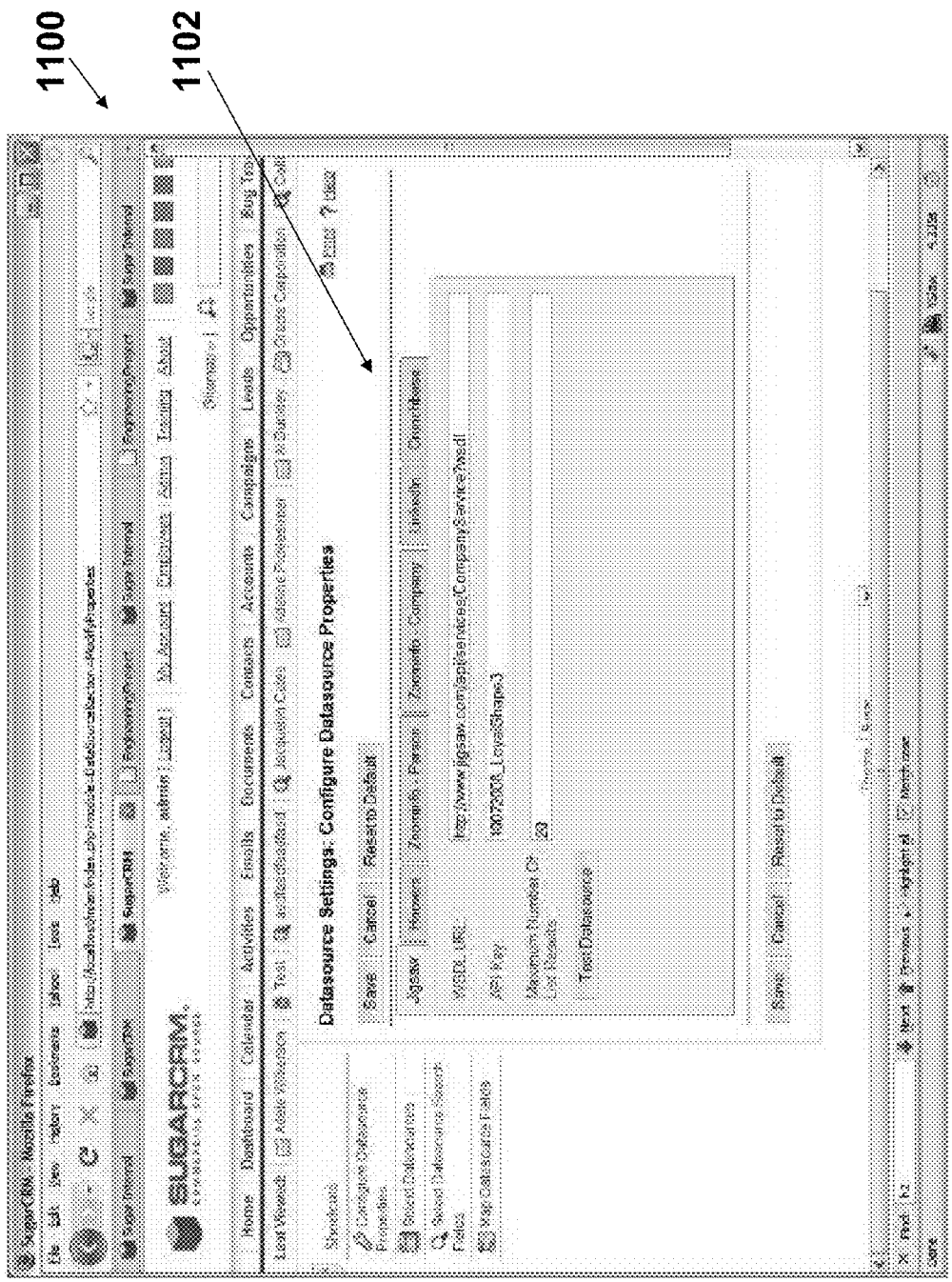
FIG. 11 illustrates an example of a user interface for configuring an external data source connector.

The administration interface of the cloud connector portion may fall under the "System Settings" category in the business software application system Admin section. After clicking on the "Connector Integration Settings" link from the "System Settings" section, the Administrator will be presented with the following list of choices:

1) Configure Connector Properties
2) Enable Connectors
3) Select Connector Search Fields
4) Map Connector Fields
and optionally some dynamic discovery properties:
5) Add or Remove Connectors
6) Discover More Connectors FIG. 11 illustrates an example of a user interface 1100 for configuring an external data source connector. This screen allows the administrator to set some basic configuration information. In the connector's configuration file (config. php) there may be a properties key/value pair(s) entry that is used. Each of these key/value pairs will appear is a portion 1102 on the screen as shown in FIG. 11. For connectors where there are no configuration properties, a message will appear stating that there are no configurable properties and there will be no labels/textfields displayed.

The administrator may test each connector to see if the API Key or Username/Password combination values are valid. The test will be a runtime test written by the connector author to use the properties configured for the connector and test the resulting call to the data service. The user interface may include a cancel button that does not commit any changes and returns the user to the Data Services administration screen. The user interface may also have a "Save" button that saves all the values entered for the connectors and return the administrator to the Data Services admin screen. The user interface may also include a "Reset to Default" button that resets the Datasource settings to the default settings so that the files in the custom/modules/Connector directory will be deleted, the application will re-scan the modules/Connector directory and use the settings defined in the config.php file and re-copy them to the custom/modules/Connector directory.

Figure 12:
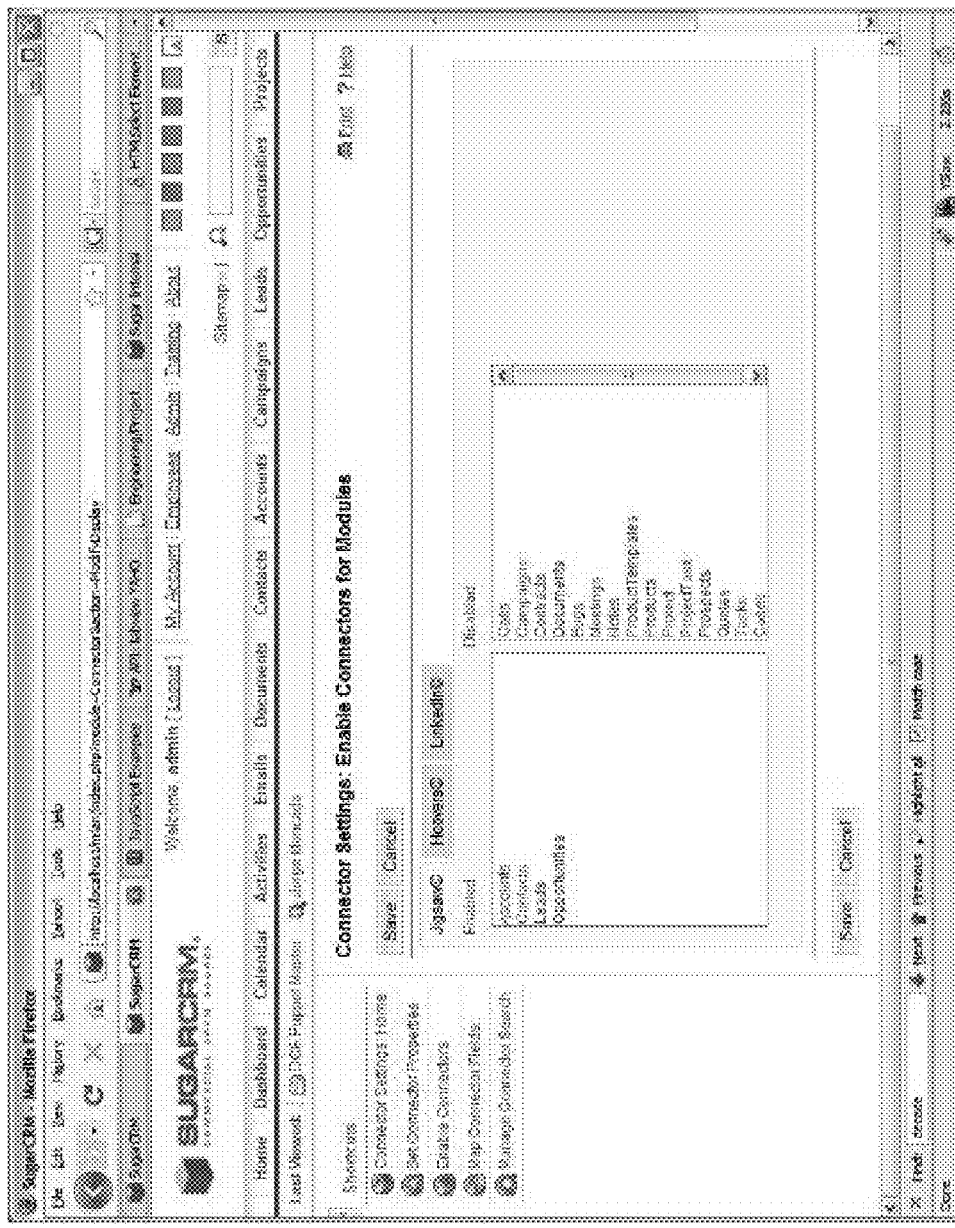
FIG. 12 illustrates an example of a user interface for enabling external data source connectors.

FIG. 12 illustrates an example of a user interface 1200 for enabling external data source connectors. In this screen, the Connectors are listed in separate tabs (for example Jigsaw, Hoovers and LinkedIn as shown in the example). When any tab is selected, such as the Jigsaw tab as shown in the example in FIG. 12, two lists of modules are displayed wherein the left hand list contain the modules that have been enabled to operate with the particular data source (such as Jigsaw) while the right hand lists contain the modules that are available for intergration with the data source, but are not currently enabled with the data source. By default, all the modules are disabled for a given connector. The list of modules shown in this screen in either of the two lists are modules that 1) have a metadata/studio.php file and also a metadata/detailviewdefs.php file so that the module can integrate an external data source.

When a module is mapped to a connector, the module's DetailView screen will have a button to take the user to the Datasource Module Wizard user interface component. In the screenshot example shown in FIG. 12, the Accounts, Contacts, Leads and Opportunities modules will display the button because they are the modules that have been configured for data services integration with Jigsaw. The user interface also has a "Cancel" button that does not commit any changes and returns the user to the Data Services administration screen and a "Save" button that saves all the values entered for the connectors and return the admin to the Data Services admin screen. Unless a module is enabled for a source, the search mapping and field mapping screens in the Connector administration section (not shown) will display an error message for that source.

Figure 13:
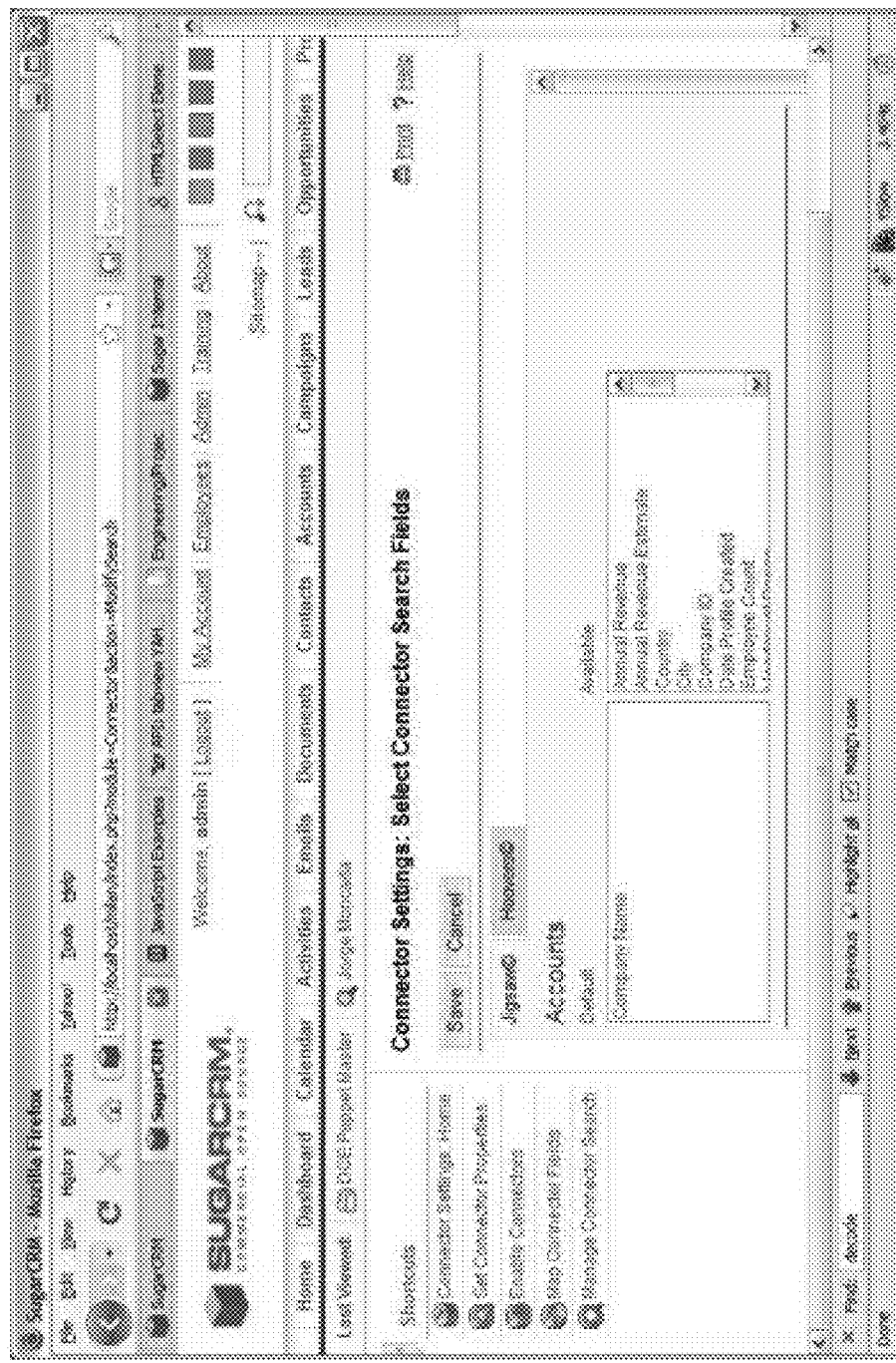
FIG. 13 illustrates an example of a user interface for selecting external data source connector search fields.

FIG. 13 illustrates an example of a user interface 1300 for selecting external data source connector search fields. This screen allows the administrator to select which fields appear on the search form for the connector module by dragging fields from the available list (available for the particular data source) to the other list. The admin also has the ability to configure the order of the search fields shown by arranging the order of the fields in the enabled list. The modules that are listed for the connector are those that have been enabled for it.

While any of the connectors fields may be added to the search screen, there are limitations as to how the connector uses these fields. Most of the connector's APIs support a very limited set of search parameters (company name, first name, email address, city, etc.). The admin should select the relevant fields for the connector. The following table shows the default connectors and the fields for a representative set of external data sources which are used by the connector for searches:

|          | Default Search Fields | Supported Search Fields |
|----------|----------------------|-------------------------|
| LinkedIn | n/a                  | n/a                     |
| Hoovers  | Company Name         | Company Name, State, City, Country, DUNS, Postal Code |
| Jigsaw   | Company Name         | Company Name            |

Figure 14:
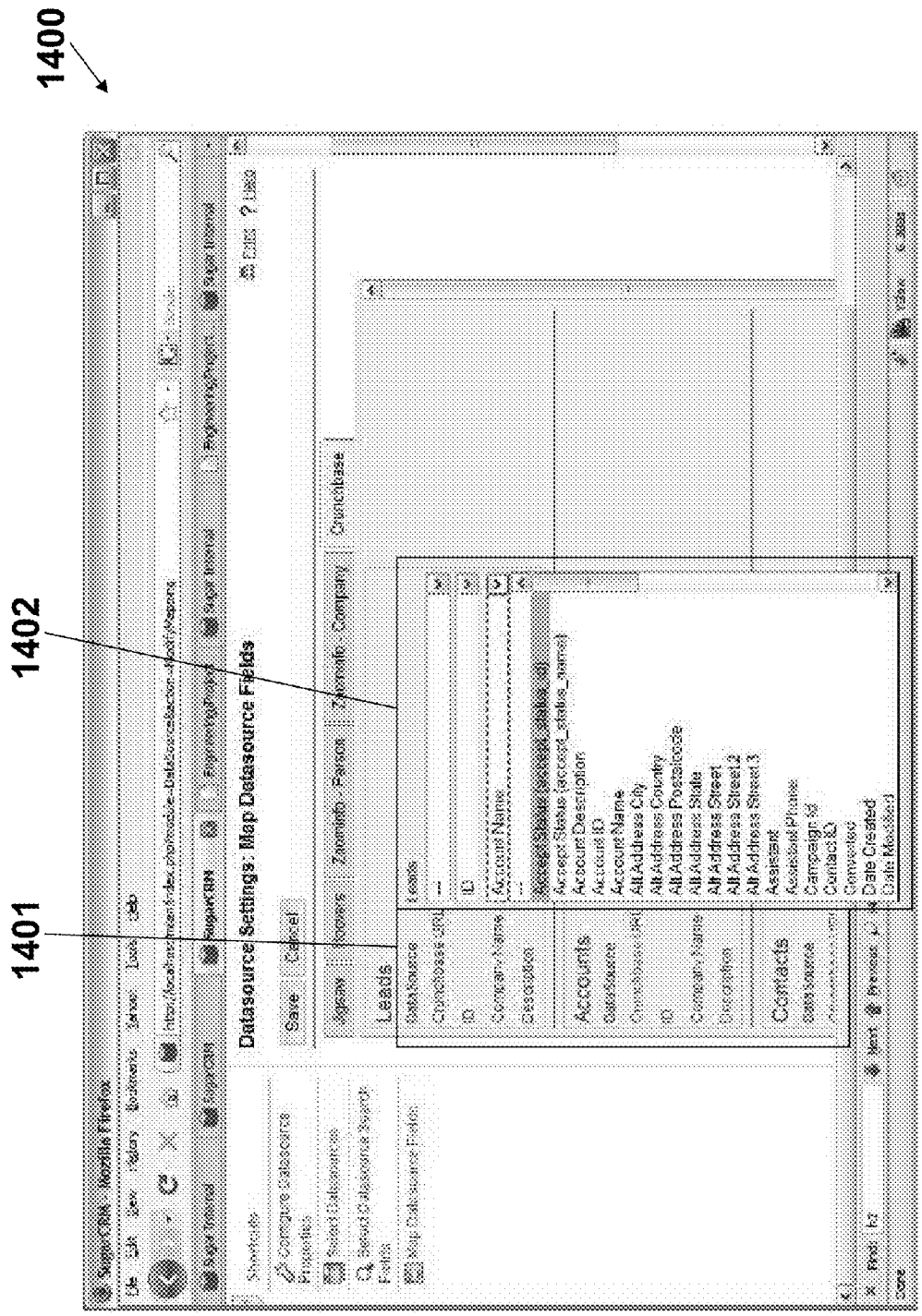
FIG. 14 illustrates an example of a user interface for mapping external data source connector fields.

FIG. 14 illustrates an example of a user interface 1400 for mapping external data source connector fields. This screen allows for connector fields as defined in the connector's vardefs.php file to be mapped to a module's fields. This mapping is used by the connector wizard components to merge the resulting connector's fields values to the module's fields. In the example, the Hoovers connector in the Accounts module will merge the Company Name value found to the Account Name value. When the changes are saved to the field mapping screen, the connector's configuration files shall be updated to reflect the new mappings and written to the custom/modules/Connector/connectors/sources subdirectories.

In the exemplary user interface, the connector's fields (data source) are listed on a left hand column 1402 and the module's fields are listed on the right hand side 1404. The module's fields will be listed in alphabetical order and duplicate field labels will display the field id surrounded by parentheses (see the "Accept Status" field above). "Link" and "Relate" field types as specified in the module's vardefs.php file will be filtered out from the dropdown list.

For each module entry shown, at least one connector field must be mapped to a module field otherwise, the user will not be able to save the changes or switch to another source tab. This check is put in place to safeguard against errors in the wizard utility as well as to allow the source to be displayed in the detailview (if it supports the hover link functionality).

Returning to FIG. 8, an example of a user interface for the connector module interface of the business software application system is shown. The connector module interface is invoked from modules which have been configured to allow for merging of the connector result values into the module's bean(s) fields. The user initiates the scrubbing process from a button on the detailview or editview.

Figure 15:
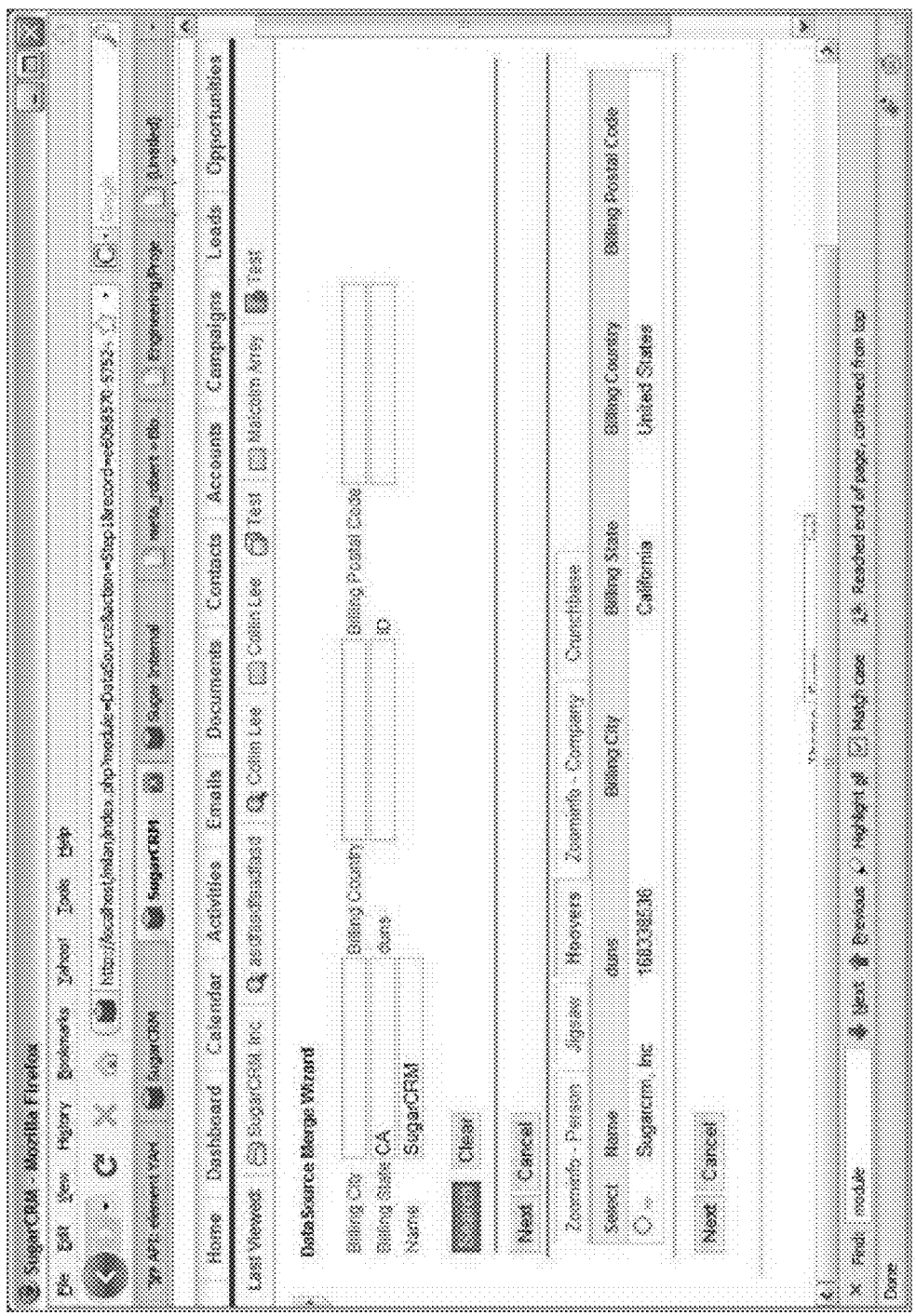
FIG. 15 illustrates an example of a user interface for an external data source wizard.

The cloud connector portion may include a wizard display component consisting of 3 steps:

1) Step 1
   Display each connector in tab with search results in a listview format as shown in FIG. 15
   Each connector result screen should also show a search form with fields that may be configured from the admin component. The user may run additional filters to refine the connector results.
   Display the current record's detail view
   Each listview record shall have an icon to support a detail view popup window as a shortcut to retrieve additional information for the listview record
   Datasource specific customizations shown in listview results
   For Hoovers connector, the ability to select a company parent link that then performs a search using the parent company name/duns/company id value
   The first step as shown in FIG. 15 shows a set of pre-configured connectors to select from.

Figure 16:
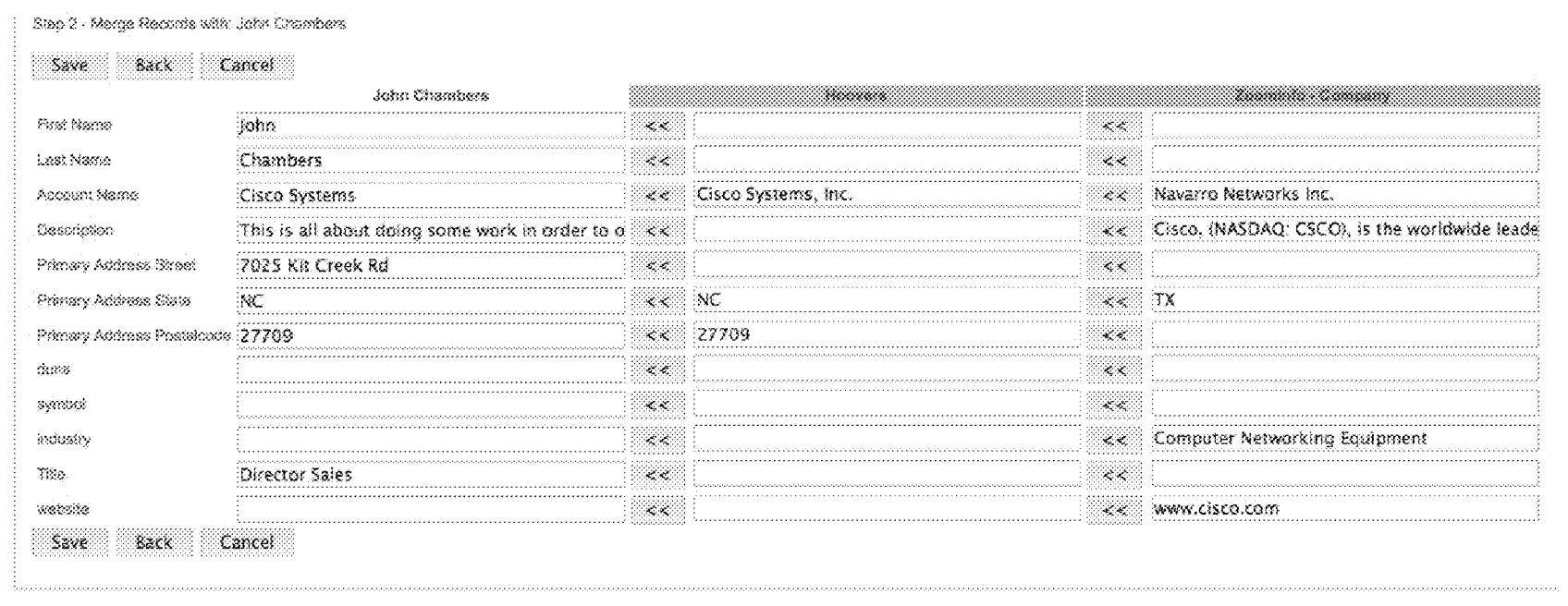

2) Step 2—Display a screen to choose which module's field(s) value should receive the connector(s) results (as shown in FIG. 16)
   Each module's field shall be listed in a separate row and there should be buttons next to each mapped connector value to copy the connector value into the module's bean field.
   The merging step may take the data from the source and merge with the bean.

3) Step 3—Commit the changes (merge the record's value(s) to the connector(s) results).

In the cloud connector portion, new connectors may be uploaded to the system through the module loader components. The new connector can leverage the module loader components and use the manifest file to copy the contents of the new connector's files to the appropriate connectors directories.

The miscellaneous widgets of the system are user interface components used throughout the application that may be customized by the connector integration code or used to link to other connector integration UI components.

Figure 17:
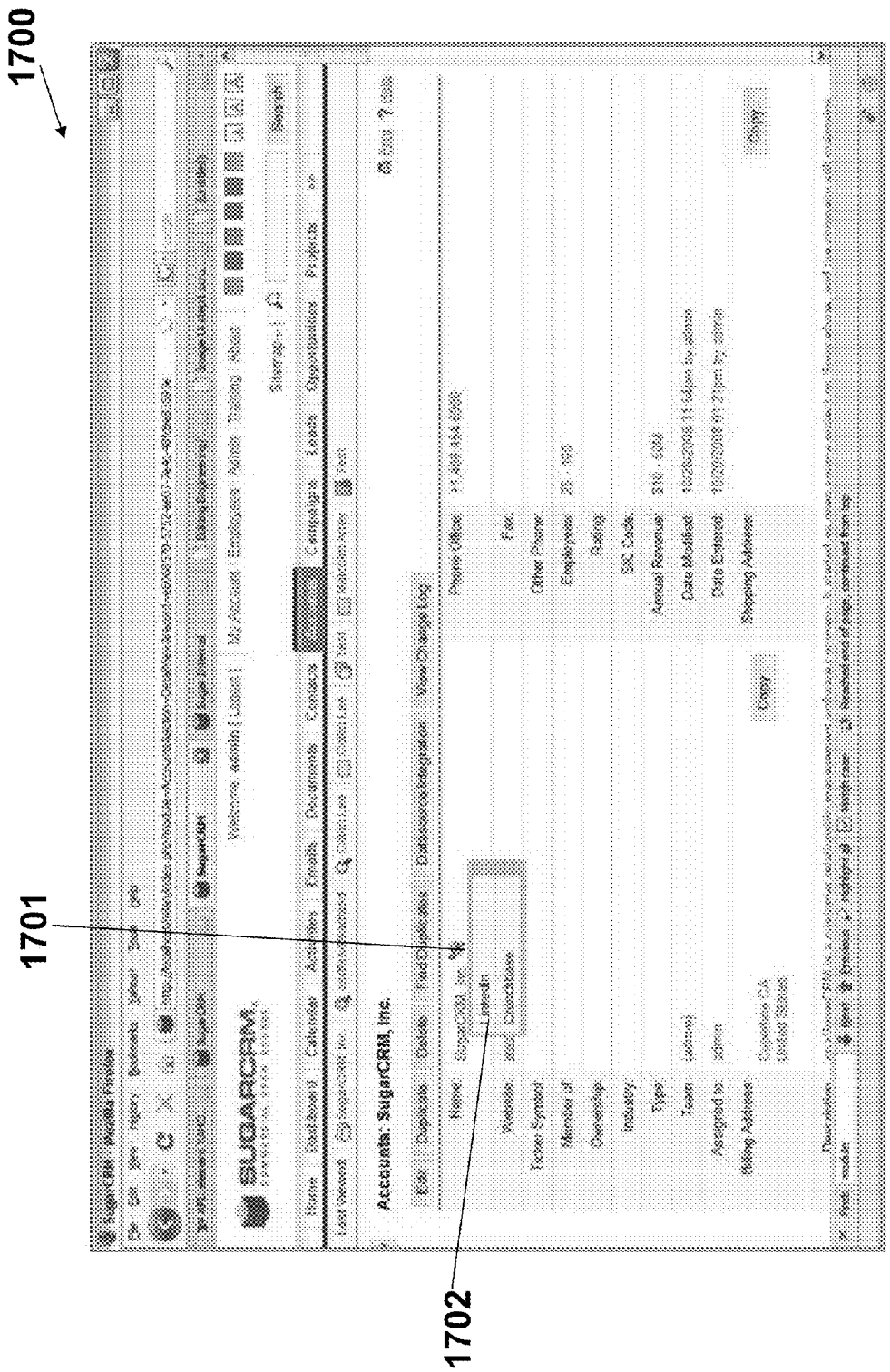
FIG. 17 illustrates an example of a user interface for a DetailView hover widget of the business software application system.
Figure 18:
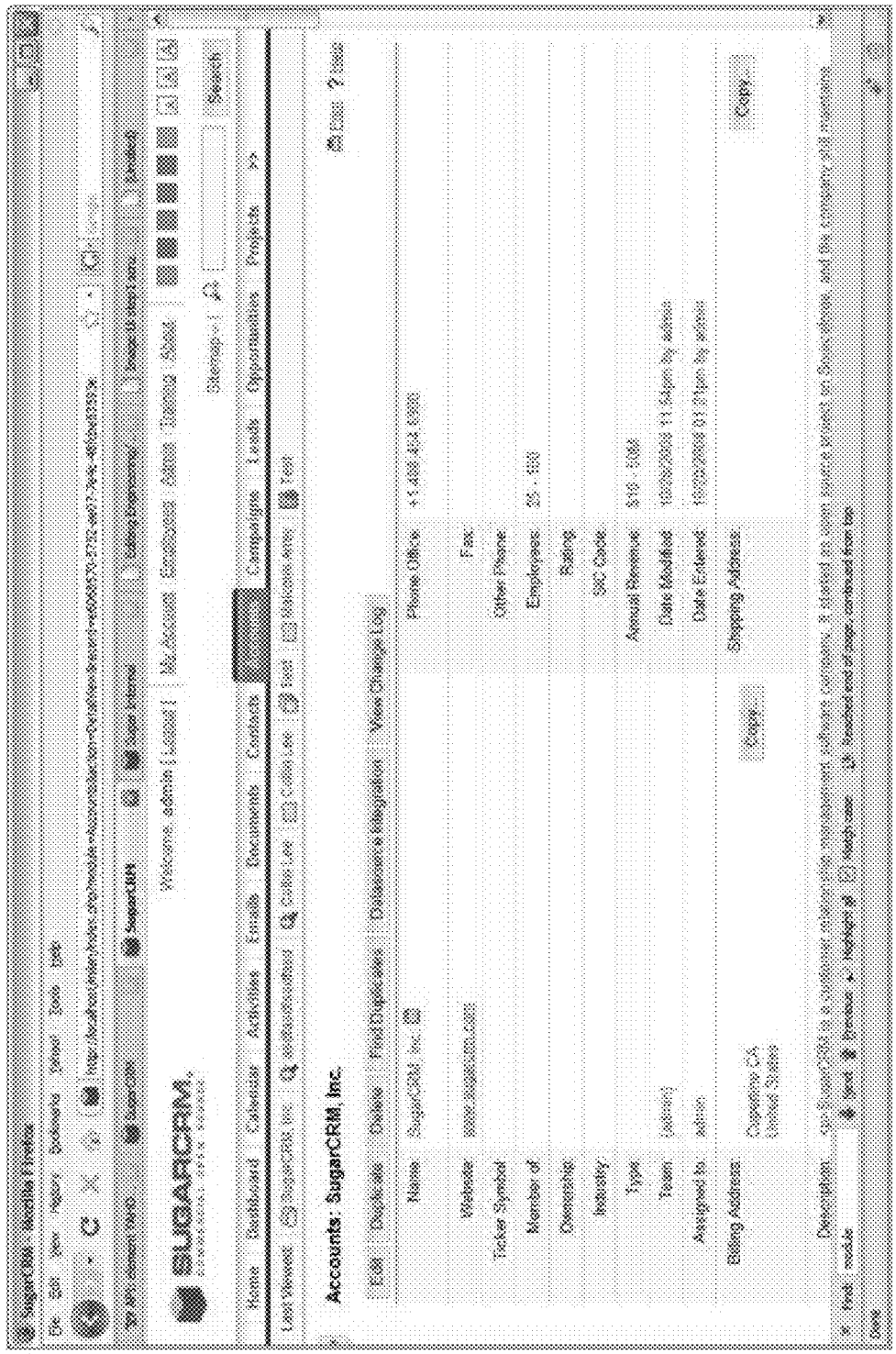
FIG. 18 illustrates an example of a user interface for a satellite icon of the business software application system.

FIG. 17 illustrates an example of a user interface 1700 for a DetailView hover widget of the business software application system. The DetailView "hover" widget handles the rendering of HTML/JS code for connectors. This widget will render an icon 1701 next to a DetailView field. On a hover (mouseover) event, this field will be activated. If there is only one connector that is enabled for the hover event in the module, this widget will render the connector icon directly. For example, if two connectors are enabled for the Accounts module, but only one (LinkedIn) is enabled for the hover event, then the LinkedIn icon will be shown as shown in FIG. 18 (if there is one specified). If there is no icon for the connector, then it will default to the satellite icon. A hover event on the icon will then invoke a popup. If there are two or more connectors enabled for the hover event, then the satellite icon will be shown. A hover event will display a dropdown menu 1702 of connectors to choose from and selecting an entry from the menu will invoke the popup.

The Connector framework allows the developer to optionally specify a field that should be designated as the hover field. This is not a field in a particular module 106, but a field that is declared in the vardefs.php file or the Connector. If this field is specified and a mapping entry exists for this field to the target module and this field is shown in the target module's detailview shown, then the Connector framework will place the icon in this field. Otherwise, the Connector framework will use the first available shown field in the module's detailview.

Another of the miscellaneous widgets may be a SugarField Widget to allow for display customizations in Step 1 or Step 2 screens of Connector Module Interface. For example, in the Hoovers listview results screen, a parent company is rendered as a hyperlink. Other types of customizations may be created—phone number formatting, mapping result values to use text values of SugarCRM lists. Another of the miscellaneous widgets may be a button shown in the detail and edit view of modules linked to connectors that take the user into the Connector Module Wizards interface.

The code framework components of the cloud connector portion are the software libraries that will be written to support the connectors integration. The software libraries will attempt to be designed correctly so as to allow additional connectors created from other developers to be easily loaded into the system. There may also be additional third-party software libraries used by the connector developer.

The module loader hook components will determine if an uploaded module is a new connector to enter into the system. If so, then the appropriate changes are made to the system so that the uploaded connector can be managed from the admin screens. The components are accessed after the connector file(s) have been successfully uploaded.

Example Manifest.php Definition:

```
<?php
    $manifest = array(
        'acceptable_sugar_flavors' => array(
            'CE',
            'PRO',
            'ENT',
        ),
        'acceptable_sugar_versions' => array(
            '5.2.0',
        ),
        'is_uninstallable' => true,
        'name' => 'ext_soap_dataflux',
        'description' => 'Hook into Dataflux',
        'author' => 'Roger Smith',
        'published_date' => '2005/08/11',
        'version' => '1.0',
        'type' => 'module',
        'icon' => '',
    );
    $installdefs = array (
        'id' => 'ext_soap_dataflux',
        'connectors' => array (
            array (
                'connector' => '<basepath>/dataflux/source',
                'formatter' => '<basepath>/dataflux/formatter',
                'name' => 'ext_soap_dataflux',
            ),
        ),
    );
?>
```

Now, a Sugar Feed portion of the business software application system is described in more detail. The Sugar Feed portion of the business software application system allows users and managers of the business software application system to have more visibility into the changes on a system by providing user with a feed of the activity on the system. The Sugar Feed portion may be implemented, in one embodiment, in a plurality of lines of computer code that are executed by the computer system that hosts the business software application system. In one embodiment, the Sugar Feed portion may be a module that is part of the modules 106 shown in FIGS. 1A and 1B. The Sugar Feed portion may allow users to select which events they do and do not want to see, may provide a dashlet so that each user can easily view his/her selected events, may allow for the system to disable this feature completely since the administrator may choose which modules to enable/disable, and/or may flush out feeds that are beyond a certain time period.

The Sugar Feed portion may permit a person or a group of users to group communications. For example, the portion may include a Sugar Feed dashlet that provides a social environment/networking feature within the system. Thus, using the Sugar Feed portion, the system automatically notifies the relevant team members of new entries of Account, Contact, Lead, and Opportunity records. The Sugar Feed portion allows users to notify team members of text messages, users to send reference to online video stream to team members and team members can directly preview and play the online video stream on his/her Sugar Feed dashlet, a user can send reference to online image to team members and team members can directly view the image on his/her Sugar Feed dashlet, a user can send reference to web page to team members, and team members can click through the link on his/her Sugar Feed dashlet and internal event sources (new events for Accounts, Contacts, Leads, Opportunities, and team member messages) can be controlled by the administrator via a graphical user interface.

The Sugar Feed portion may include code (an example of which is shown in FIG. 21) that hooks into the logic hooks to write updates into a pre-parsed format into a Sugar Feed database table that can then be displayed using a dashlet, the dashlet (described below in more detail) to read a filtered selection of the database table entries and translate them into the user's language (such as English, Russian, etc.), code in the dashlet to automatically clear out feed records over a predetermined time, such as two weeks old so that older events that might otherwise be displayed in the dashlet are not displayed.

Figure 19:
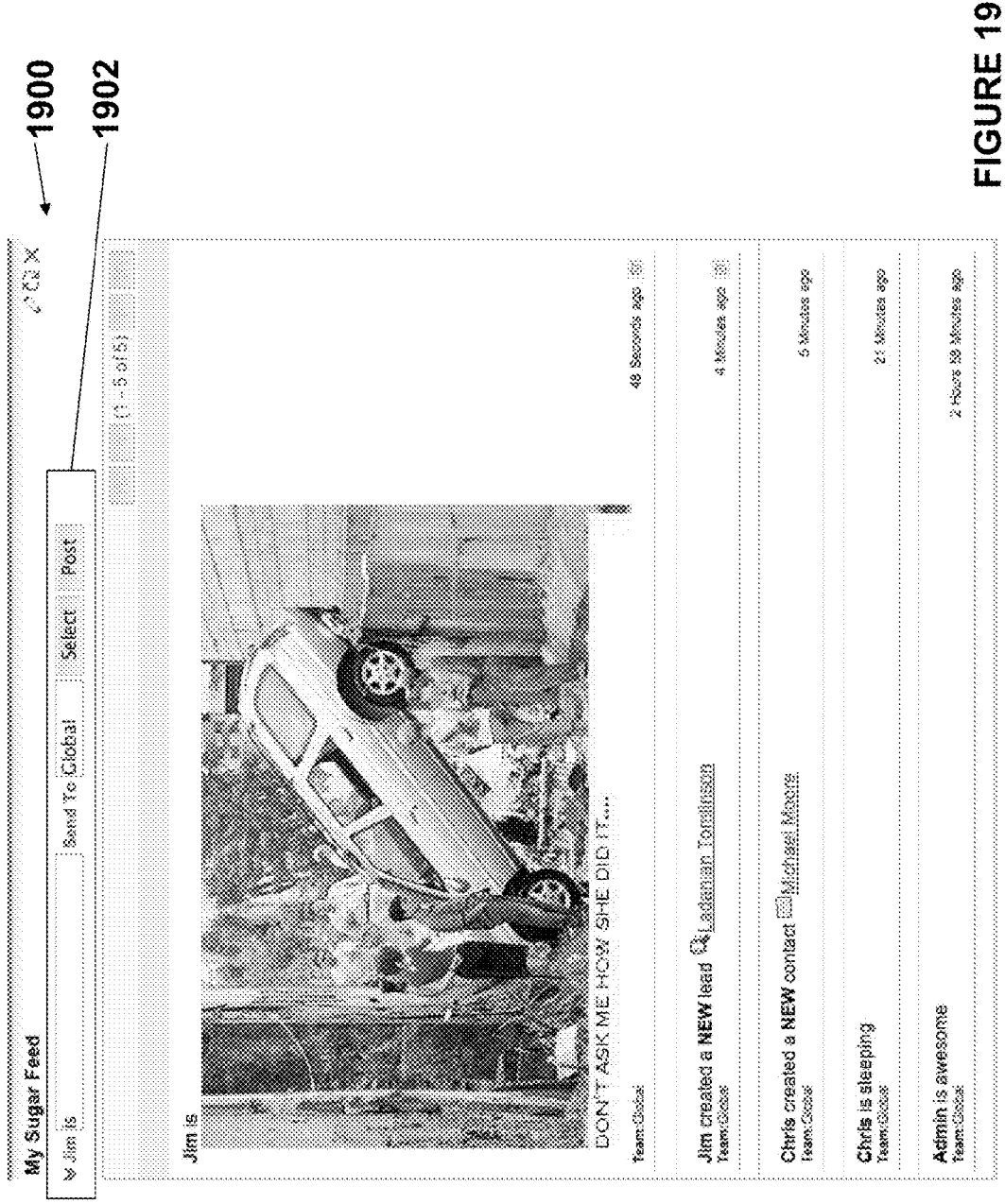
FIG. 19 illustrates an example of a user interface for a Sugar feed of the business software application system for a particular user.

FIG. 19 illustrates an example of a dashlet 1900 of the Sugar Feed portion of the business software application system for a particular user wherein the dashlet displays the latest feed entries. If the Sugar Feed system is disabled, the dashlet will only display a message about how the Sugar-Feed system is administratively disabled. As shown in FIG. 19, a user (Jim in this example) sends a message (a new photo/image, lead and/or contact) to a group/team ("Global" in this example) selected by the user using a command line 1902. The other posts/messages for the team/group are shown below the latest post wherein the older posts are displayed in the dashlet towards the bottom of the dashlet.

Figure 20:
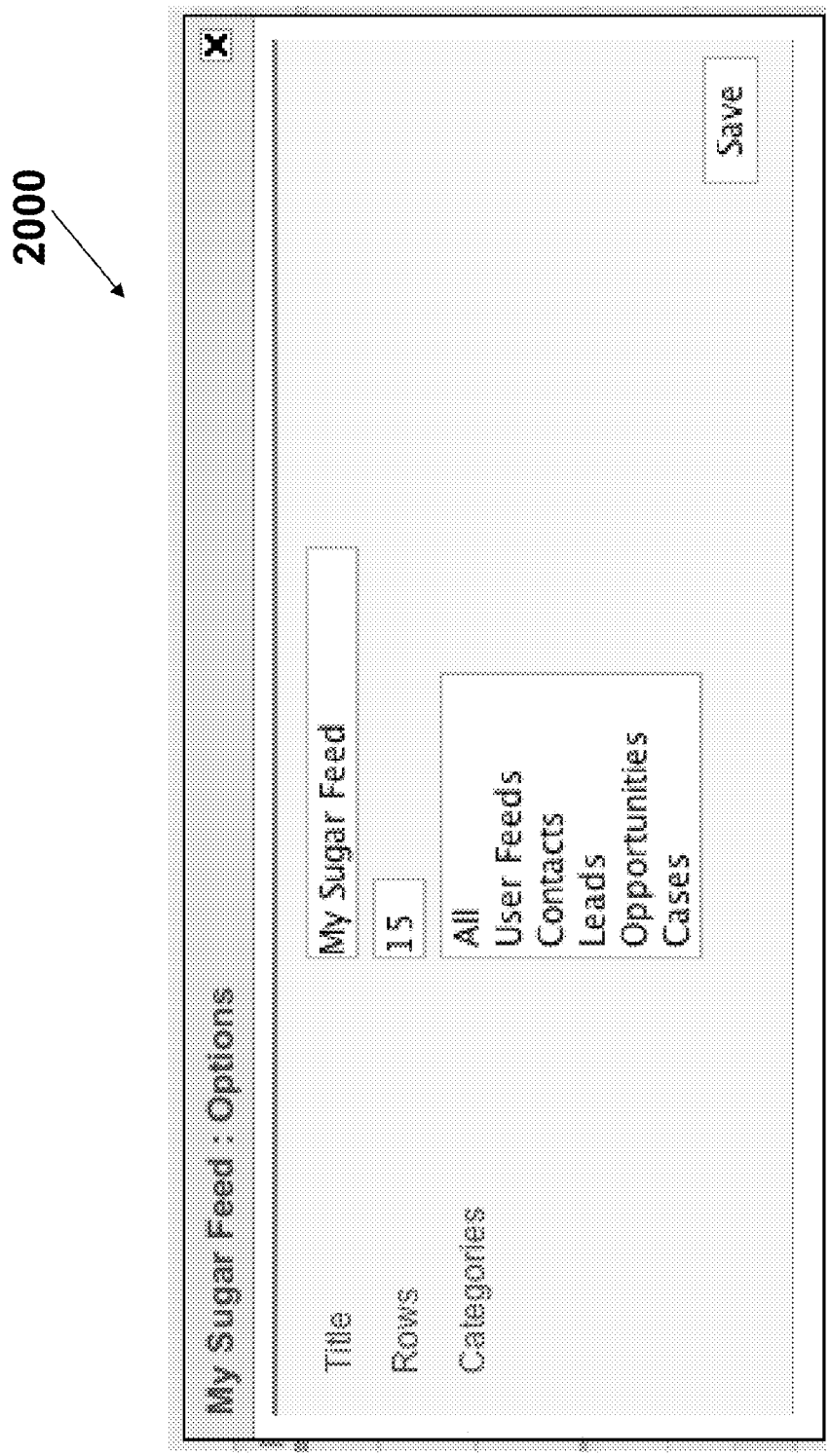
FIG. 20 illustrates an example of a user interface for configuring a My Sugar feed of the business software application system.

FIG. 20 illustrates an example of a user interface for configuring a My Sugar feed of the business software application system. In particular, a dashlet configuration user interface 2000 is shown in FIG. 20. The dashlet configuration panel allows a user to select a title for the feed, a number of rows of the particular feed and to select from which modules the user wishes to see feed entries ("All", "User Feeds", "Contacts", etc.) as shown in FIG. 20.

The Sugar Feed portion may also have administrator settings to disable the entire feed system (defaults to enabled), administrator settings to enable/disable feeds on a per-module basis (defaults to all available modules), an administrator button to flush the internal sugar feed cache (resets the list of available modules and available link types, there is no current cache of any of the sugar feed records) and/or an administrator button to clear all sugar feed records.

Now, several use cases of the Sugar Feed portion are described in more detail. The user cases may include user status, leads/contacts, opportunities, cases and external media. An example of user status use case is that a user may enter a status (Jim is working on a huge deal or Sally is not in office), which may be published as a feed to others. An example of leads/contacts use case is, when a user creates a new Lead or Contact, this will show up as a feed to the team that the user is assigned to so that everyone on the team can see the new lead or contact. In addition, when a lead is converted, it is also displayed in the feed. An example of an opportunity use case is when a user creates a new Opportunity that will show up as a feed to the team that the opportunity is assigned to and, when a user closes a deal, this will also display as a feed. An example of a cases use case is when a user creates a new Case, the new case will show up as a feed to the team that the bean is assigned to and, when a Case is closed, a notification will also be posted. An external media use case is that the dashlet can be used to display a YouTube video, an external Link and/or an image as shown in FIG. 19.

The modules 106 of the business software application system can be enabled for the Sugar Feed system (to allow data from the module to be shared by the Sugar Feed portion) by adding a PHP class in either the 'modules/<module>/SugarFeeds/' directory or the 'custom/modules/<module>/SugarFeeds/' directory. New modules will appear automatically in the Sugar Feed administration screen, and can then be enabled. Existing module-specific feed beans can be overridden by placing an identically named file in the 'custom/modules/<module>/SugarFeeds/' directory. Link types can also be modified by adding additional files in the 'modules/SugarFeeds/linkHandlers' or 'custom/modules/SugarFeeds/linkHandlers' directory. Existing link types can be overridden by placing an identically named file in the 'custom/modules/SugarFeeds/linkHandlers' directory. When a new link type is added you must flush the link type cache by going to the Sugar Feed administration screen and clicking the "Flush Sugar Feed Cache" button. The link types in the Sugar Feed portion may include, for example, YouTube link type and Image link type.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A business software application system, comprising:
a computer with a processor;
an application having a plurality of lines of computer code wherein the plurality of lines of computer code are executed by the processor of the computer to generate a user interface of the application;
the application having multiple different connectors to multiple different internal and external data sources wherein each of the connectors retrieves one or more data fields of a corresponding one of the data sources and maps the one or more data fields from the corresponding one of the data sources into a textual data field associated with the application, the external data sources comprising textual sources from different Web Services sources, each of the connectors including both a data merging portion that interrelates complementary textual data within the textual data fields of the application as retrieved from the data fields of the data sources and removes redundant textual data within the textual data fields of the application as retrieved from the data fields of the data sources, wherein the application sets a priority of each of the external data sources based on priority parameters comprising a volume of data retrieved from each external data source, a watch counter for each time data is retrieved from each external data source, an update frequency of each external data source and a search ranking of each external data source, and also a hot field that designates a textual data field that is automatically retrieved from a corresponding one of the data sources in response to corresponding textual data entering the hot field;
the application having a data structure representing relationships between fields and objects under the management of the connectors;
the application employing one or more algorithms for managing data and relationships between fields and objects under the management of the connector.

2. The system of claim 1, wherein an administrative interface manually sets the priority of each data source.

3. The system of claim 1, wherein each of the connectors further comprises a healing mechanism when data from a particular one of the data sources changes.

4. The system of claim 3, wherein the healing mechanism further comprises an explicit healing mechanism that triggers an alert when the data from a particular one of the data sources changes.

5. The system of claim 3, wherein the healing mechanism further comprises an implicit healing mechanism to resolve the data changes from a particular one of the data sources.

6. The system of claim 1, wherein each connector further comprises a data factory class that returns a source instance from a source identifier, a data source class that encapsulates the data from the data source in a single data record and a data formatter class that renders display elements based on the data source.

7. The system of claim 6, wherein each connector further comprises a mapping file that maps one or more data fields of a corresponding one of the data sources to one or more data fields of the application.

8. The system of claim 1, wherein a cloud connector portion further comprises a hover widget user interface element that is placed onto the user interface of the application to display the one or more data sources.

* * * * *